(12) United States Patent
Brodzik et al.

(10) Patent No.: US 8,811,535 B2
(45) Date of Patent: Aug. 19, 2014

(54) TIME-FREQUENCY SPACE CONSTRUCTIONS OF FAMILIES OF SIGNALS

(75) Inventors: Andrzej K. Brodzik, Jamaica Plain, MA (US); Richard Tolimieri, Huntsville, AL (US)

(73) Assignee: Mitre Corporation, McLean, VA (US)

( * ) Notice: Subject to any disclaimer, the term of this patent is extended or adjusted under 35 U.S.C. 154(b) by 1366 days.

(21) Appl. No.: 12/505,073

(22) Filed: Jul. 17, 2009

(65) Prior Publication Data

US 2011/0013716 A1 Jan. 20, 2011

Related U.S. Application Data

(60) Provisional application No. 61/226,384, filed on Jul. 17, 2009.

(51) Int. Cl.
| | |
|---|---|
| *H03K 9/00* | (2006.01) |
| *G11C 11/00* | (2006.01) |
| *C12Q 1/70* | (2006.01) |
| *G01S 13/00* | (2006.01) |
| *G01S 13/28* | (2006.01) |
| *H04J 13/10* | (2011.01) |
| *H04L 27/26* | (2006.01) |

(52) U.S. Cl.
CPC ........... *H04L 27/2626* (2013.01); *G01S 13/003* (2013.01); *G01S 13/284* (2013.01); *H04J 13/10* (2013.01)
USPC ................................ 375/316; 365/151; 435/5

(58) Field of Classification Search
CPC ....... H04J 13/16; H04J 13/0025; G01S 13/89; G01S 7/285; H04B 1/7105; H04B 17/0057
USPC ............... 375/240.19, 316; 365/151; 382/167
See application file for complete search history.

(56) References Cited

U.S. PATENT DOCUMENTS

| | | | | |
|---|---|---|---|---|
| 5,569,754 | A | * 10/1996 | Williams et al. | 536/23.5 |
| 5,686,683 | A | * 11/1997 | Freed | 84/625 |
| 6,324,091 | B1 | * 11/2001 | Gryko et al. | 365/151 |
| 7,289,102 | B2 | * 10/2007 | Hinckley et al. | 345/156 |
| 2003/0104499 | A1 | * 6/2003 | Pressman et al. | 435/7.23 |
| 2003/0166279 | A1 | * 9/2003 | Sabbadini et al. | 435/449 |

(Continued)

OTHER PUBLICATIONS

Brodzik, "Characterization of Zak Space Support of a Discrete Chirp" published on 2007, pp. 2190-2203.*

(Continued)

*Primary Examiner* — Leon-Viet Nguyen
*Assistant Examiner* — Sarah Hassan
(74) *Attorney, Agent, or Firm* — Proskauer Rose LLP

(57) ABSTRACT

A computer-implemented method and system for generating large families of sequences with desirable properties for many applications, including communications and radar applications, applies constraints to a sequence in the Zak space, modulates the constrained sequence in the Zak space, and determines permutations of the modulated sequence in the Zak space. The constraints are associated with predetermined properties, including predetermined autocorrelation and cross-correlation properties. Other embodiments of the computer-implemented method and system transform an input sequence into a transformed sequence using the finite Zak transform and determine at least one other different sequence based on the transformed sequence. The at least one other different sequence can be determined by collecting a plurality of sequences that are finitely supported on an algebraic line in the Zak space and modulating and/or determining permutations of some or all of the sequences.

2 Claims, 13 Drawing Sheets

(56) References Cited

U.S. PATENT DOCUMENTS

| | | | | |
|---|---|---|---|---|
| 2004/0044715 A1* | 3/2004 | Aldroubi et al. | | 708/490 |
| 2005/0041494 A1* | 2/2005 | Bocian et al. | | 365/202 |
| 2007/0043290 A1* | 2/2007 | Goepp et al. | | 600/437 |
| 2011/0129147 A1* | 6/2011 | Monga et al. | | 382/167 |

OTHER PUBLICATIONS

Brodzik, "Characterization of Zak Space Support of a Discrete Chirp," *IEEE Transactions on Information Theory*, vol. 53(6) (Jun. 2007), pp. 2190-2203.

Chu, "Polyphase Codes with Good Periodic Correlation Properties," *IEEE Transactions on Information Theory* (Jul. 1972), vol. 18, No. 34, pp. 531-532.

Davis et al., "Codes, Correlations and Power Control in OFDM," published in *Difference Sets, Sequences, and their Correlation Properties* (1999) by Pott et al., pp. 113-132.

Deza et al., "Bounds for Permutation Arrays," *Journal of Statistical Planning and Inference* (1978), vol. 2, pp. 197-209.

Ding et al., "Constructions of Permutation Arrays," *IEEE Transactions on Information Theory*, vol. 48, No. 4, (Apr. 2002), pp. 977-980.

Frank et al., "Phase Shift Pulse Codes with Good Periodic Correlation Properties," *IRE Trans. on Information Theory*, vol. IT-8 (Oct. 1962), pp. 381-382.

Games, "Crosscorrelation of M-Sequences and GMW-Sequences with the Same Primitive Polynomial," *Discrete Applied Mathematics* (1985), vol. 12, pp. 139-146.

Gottesman et al., "A Class of Pseudonoise-Like Pulse Compression Codes," *IEEE Transactions on Aerospace and Electronic Systems*, vol. 28(2) (Apr. 1992), pp. 355-362.

Janssen, "On the Locus and Spread of Pseudo-Density Functions in the Time-Frequency Plane," *Philips J. Res. 37* (1982), pp. 79-110.

Janssen, "The Zak Transform: A Signal Transform for Sampled Time-Continuous Signals," *Philips J. Res.* (1988), vol. 43, pp. 23-69.

Janssen, "Zak Transforms with Few Zeros and the Tie," published in *Advances in Gabor Analysis* (2002) pp. 32-70.

Janssen, "On Generating Tight Gabor Frames at Critical Density," *Journal of Fourier Analysis and Applications*, vol. 9(2) (2003), pp. 175-214.

Joseph et al., "Under-sampled Weyl-Heisenberg expansions via orthogonal projections in Zak space," *Signal Processing*, (2001), vol. 81, pp. 2383-2402.

Klauder et al., "The Theory and Design of Chirp Radars," *The Bell System Technical Journal*, (Jul. 1960), vol. 39, pp. 745-808.

Kumar et al., "Prime-Phase Sequences with Periodic Correlation Properties Better than Binary Sequences," *IEEE Transactions on Information Theory*, vol. 37(3) (May 1991), pp. 603-616.

Lerner, in *Lectures on Communication System Theory* by Baghdady, "Representation of Signals," Chapter 10, pp. 203-242, 1961.

Mustard, "The Fractional Fourier Transform and the Wigner Distribution," *J. Austral. Math. Soc. Ser. B.*, vol. 38 (1996), pp. 209-219.

Olsen et al., "Bent-Function Sequences," *IEEE Transactions on Information Theory*, vol. IT-28(6) (Nov. 1982), pp. 858-864.

Popovic, "Generalized Chirp-Like Polyphase Sequences with Optimum Correlation Properties," *IEEE Transactions on Information Theory*, vol. 38(4) (Jul. 1992), pp. 1406-1409.

Sarwate, "Bounds on Crosscorrelation and Autocorrelation of Sequences," *IEEE Transactions on Information Theory*, vol. IT-25(6) (Nov. 1979), pp. 720-724.

Sarwate, "Crosscorrelation Properties of Pseudorandom and Related Sequences," *Proceedings of the IEEE*, vol. 68(5) (May 1980), pp. 593-619.

Scholtz, "Group Characters: Sequences with Good Correlation Properties," *IEEE Transactions on Information Theory*, vol. IT-24(5) (Sep. 1978), pp. 537-545.

Suehiro, "Modulatable Orthogonal Sequences and their Application to SSMA Systems," *IEEE Transactions on Information Theory*, vol. 34(1) (Jan. 1988), pp. 93-100.

Tan, "Multicarrier Spread Spectrum System with Constant Envelope: Antijamming, Jamming Estimation, Multiuser Access," *IEEE Transactions on Wireless Communications*, vol. 4(4) (Jul. 2005), pp. 1527-1538.

Tolimieri et al., "Computing the Ambiguity Surface," *IEEE Transactions on Acoustics, Speech, and Signal Processings*, vol. ASSP-33(4) (Oct. 1985), pp. 1239-1245.

Zak, "Finite Translations in Solid-State Physics," *Physical Review Letters*, vol. 19(24) (Dec. 1967), pp. 1385-1387.

S.W. Golomb & G. Gong, *Signal Design for Good Correlation*, Chapter 6 "Randomness Measurements and m-Sequences," Associated Press (2005) pp. 117-161.

* cited by examiner

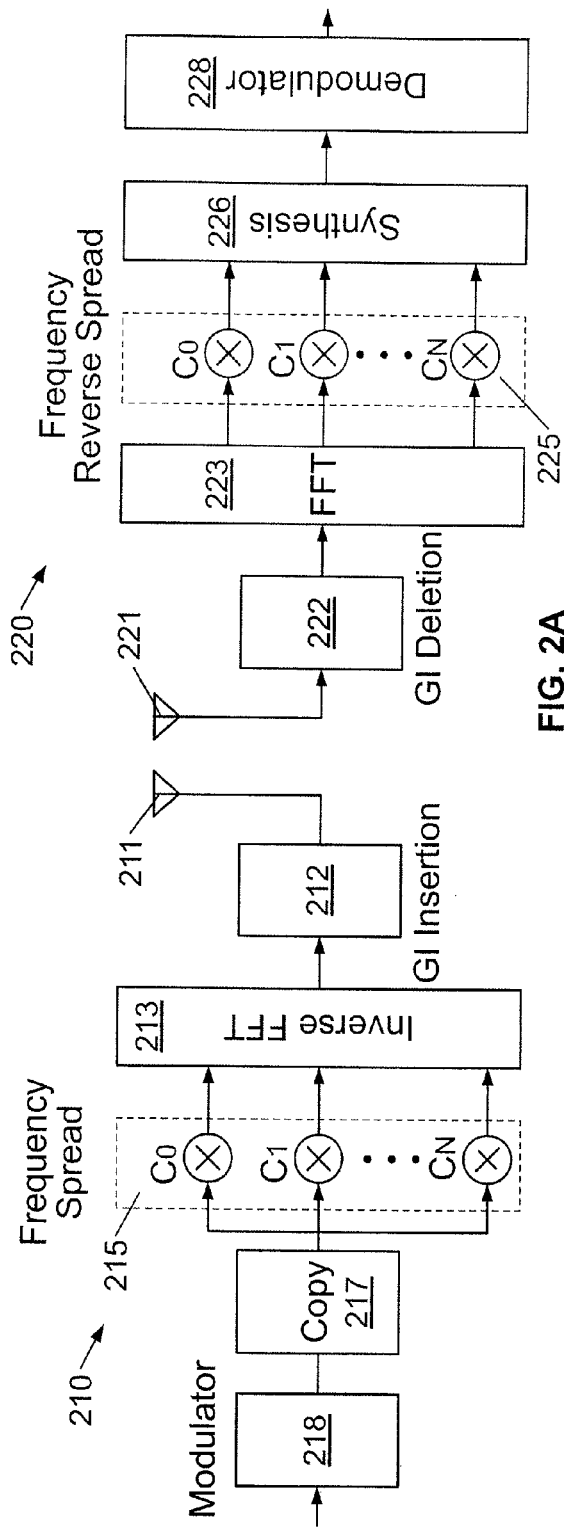
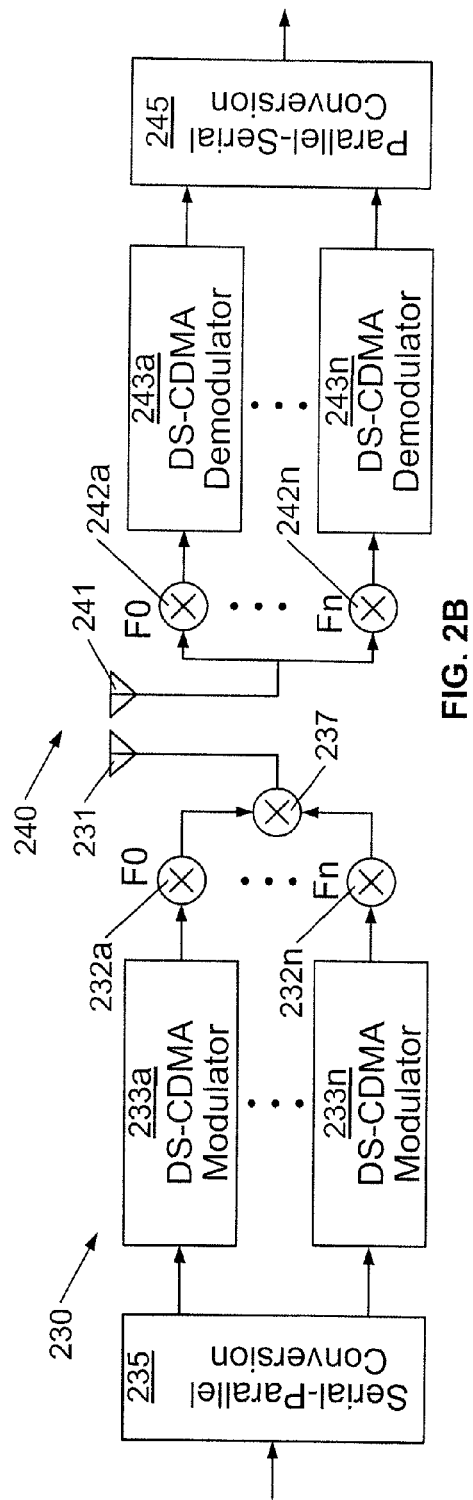
FIG. 2A
FIG. 2B

TIME-FREQUENCY SPACE CONSTRUCTIONS OF FAMILIES OF SIGNALS

CROSS-REFERENCE TO RELATED APPLICATIONS

This application claims priority to and the benefit of U.S. Provisional Patent Application Ser. No. 61/226,384, filed on Jul. 17, 2009, the entire contents of which are incorporated herein by reference.

TECHNICAL FIELD

This invention relates generally to methods and systems for generating and using signals. In particular, the invention relates to methods and systems for generating families of signals with desirable properties, including desirable correlation properties, for a variety of applications, including radar, communications, sonar, watermarking, and cryptography.

BACKGROUND

Signals are useful for a variety of applications. Some applications involve simultaneously generating and using multiple signals. Sometimes signals propagating through a medium can (at least partially) interfere with each other. For example, electromagnetic signals exhibit this behavior. This interference can sometimes be undesirable. For example, when the signals serve as information carriers, the interference can lead to loss of information contained in one or more of the signals.

One example application involves multiple-input, multiple-output ("MIMO") detection systems. In particular, MIMO radar is an emerging technology that is attracting the attention of researchers and practitioners alike. Among recent efforts in this area is the design of a multi-waveform radar system for urban warfare. The popularity of radar is at least in part attributable to improved capabilities of multi-beam radar, as compared with standard phased-array and single-input multiple-output (SIMO) radar.

FIGS. 1A and 1B show an exemplary MIMO radar system used to detect airborne vehicles or objects, although a similar radar system can be designed for use in urban warfare. This exemplary MIMO radar system includes a transmitter subsystem 141 (FIG. 1A) and a receiver subsystem 142 (FIG. 1B). The transmitter subsystem 141 includes a code sequence store 111, which can store orthogonal code sequences or any other code sequences with desired properties, e.g., cross-correlation properties. The transmitter subsection also includes multiple digital modulators 115a-115c, each of which modulates a different code from the code sequence store 111. The digital modulators 115a-115c can use any form of digital modulation such as Phase Shift Keying (PSK). The transmitter subsystem 141 also includes an oscillator 113 for generating an RF signal and multiple frequency mixers or up converters 117a-117c. The frequency mixers 117a-117b modulate the RF signal from the oscillator 113 with modulated codes from the digital modulators 115a-115c to generate multiple modulated RF signals. The transmitter subsystem 141 includes multiple transmitters 119a-119c that radiate the modulated RF signals as electromagnetic signals 131.

If there is an object 150 (e.g., an airborne vehicle) in the path of the signals 131, a portion of each signal 132 is scattered off object 150 and nearby objects 151, 152 (e.g., airborne vehicles) towards multiple receivers 129a-129c of the receiver subsystem 142 (FIG. 1B). The receiver subsystem includes multiple mixers or down converters 127a-127c that down convert the RF signals 132 received by the multiple receivers 129a-129c to baseband frequency using the RF signal generated by the oscillator 123. The receiver subsystem 142 also includes matched filters 125a-125c that filter the down-converted RF signals 132 based on the codes in the code sequence store 111 to detect the codes in the down-converted RF signals 132. The filtered signals are then summed by a summer 121 and passed to a detector 130, such as a peak search and threshold detector. If the detector 130 detects the object 150, it can generate a signal indicating that the object 150 has been detected and determine the location of the object 150.

A MIMO configuration sometimes offers advantages over alternative configurations. For example, a MIMO detection system (radar, sonar, etc.) makes it possible to use adaptive localization and detection techniques. In addition, the probing signal vector transmitted by a MIMO radar system can be designed to approximate a desired transmit beam pattern and to minimize the cross-correlation of the signals bounced from various targets of interest. MIMO radar has potential for fading mitigation, resolution enhancement, and interference and jamming suppression.

Fully exploiting these potentials can result in significantly improved target detection, parameter estimation, and target tracking and recognition performance. To realize these advantages, the information contained in individual components of the echo should be unambiguously retrieved at the receiver. At the same time, to maintain an acceptable receiver signal-to-noise ratio, a waveform set must make optimal use of the available bandwidth. To accommodate these two constraints, one must identify a waveform set that is sufficiently large and whose individual members interfere with each other as little as possible. Techniques exist for developing appropriate waveform sets, however, these techniques are only useful to develop a limited number of waveforms for particular applications.

Another example application that involves simultaneously generating and using multiple signals is wireless communications. Multicarrier techniques are used in wireless communications systems to improve the bandwidth efficiency and reduce the inter-symbol interference of the communications system. Several techniques divide the available portion of the usable electromagnetic spectrum among many channels, and/or transmit data with multiple carriers. Multiple access techniques can be used to increase the number of users that may access the wireless services provided by the system at any given time. Multicarrier and multiple access techniques can also be combined to serve many users simultaneously and provide them with the bandwidth efficiency and wireless services they desire. Examples of multiple access techniques include: Orthogonal Frequency Division Multiplexing (OFDM), Frequency Division Multiple Access (FDMA), Time Division Multiple Access (TDMA), and Code Division Multiple Access (CDMA) and its many variations. Examples of combined multicarrier/multiple access techniques include Orthogonal Frequency Division Multiple Access (OFDMA), Multicarrier Code Division Multiple Access (MC-CDMA), and Multicarrier Direct Sequence CDMA (Multicarrier DS-CDMA).

FIG. 2A is a circuit block diagram of an exemplary MC-CDMA system. The MC-CDMA system includes a transmitter subsystem 210 and a receiver subsystem 220. The transmitter subsystem 210 includes a digital modulator 218 that modulates a given digital input signal to obtain a symbol and a "Copy" unit 217 that copies the symbol to multiple subcarriers. The transmitter subsystem 210 further includes a frequency spread unit 215 that applies spread-spectrum code sequences $C_0, C_1, \ldots, C_N$ to each of the subcarriers. These code sequences can be designed to have specified auto- and cross-correlation properties. The transmitter subsystem 210 also includes an Inverse Fast Fourier Transform (FFT) unit that computes the Inverse FFT of the coded subcarriers and a guard insertion unit 212 that inserts guard intervals. The transmitter subsystem 210 lastly includes an antenna 211 that transmits the resulting signal.

The receiver subsystem 220 includes an antenna 221, a guard interval deletion unit 222, an FFT unit 223, a frequency reverse spread unit 225, a synthesis unit 226, and a demodulator 228. When the antenna 221 receives a signal, the guard interval deletion unit 222 removes a guard interval from the signal and the FFT unit 223 computes the FFT of the resulting signal. The frequency reverse spread unit 225 then applies codes to the signal transformed by the FFT unit 223 and the synthesis unit 226 synthesizes the result to obtain symbols. The demodulator 228 then demodulates those symbols to obtain digital data.

FIG. 2B is a circuit block diagram of an exemplary multicarrier DS-CDMA system. The multicarrier-CDMA system also includes a transmitter subsystem 230 and a receiver subsystem 230. The transmitter subsystem 230 includes a serial-to-parallel conversion unit 235, multiple DS-CDMA modulators 233a-233n, respective RF frequency mixers 232a-232n, a summer unit 237, and an antenna 231. The serial-to-parallel conversion unit 235 takes a serial input signal and converts it into multiple parallel signals to be input to respective DS-CDMA modulators 233a-233n.

The DS-CDMA modulators 233a-233n apply spreading code sequences with desired properties to the parallel signals. Each RF frequency mixer 232a-232n then modulates an associated subcarrier $f_0, \ldots, f_n$ with a respective coded signal. The subcarriers $f_0, \ldots, f_n$ may be designed to be orthogonal to each other to reduce the spacing between subcarriers and to improve utilization efficiency. Then, the summer unit 237 sums the modulated subcarriers and the resulting signal is transmitted from antenna 231.

The receiver subsystem 240 includes an antenna 241, RF frequency mixers 242a-242n, DS-CDMA demodulators 243a-243n, and a parallel-serial conversion unit 245. The RF frequency mixers 242a-242n modulate a signal received from antenna 241 with subcarriers $f_0, \ldots, f_n$ to obtain multiple coded signals. Each DS-CDMA demodulator 243a-243n then demodulates a coded signal from a respective RF frequency mixer 242a-242n using an appropriate code. Finally, the parallel-to-serial conversion unit 245 serializes the demodulated signals.

Each of the techniques and systems described above (and other communications techniques and systems) depend on the auto-correlation and cross-correlation properties of the deployed code sequences or spreading code sequences. For these applications, desirable auto-correlation properties often come at the expense of undesirable cross-correlation properties. Therefore, when designing a wireless multicarrier/multiple access communications system, the auto-correlation and cross-correlation properties need to be optimized.

There are many specific techniques and tools for designing signals or code sequences for use in a variety of applications, including MIMO radar and wireless communications systems. Some of these techniques involve designing finite sequences that meet desired properties, such as desired auto- and cross-correlation properties. Indeed, perfect sequences (i.e., sequences having perfect auto- and cross-correlation properties) have been designed for linear system parameter identification, real-time channel evaluation, direct-sequence spread-spectrum direct access, and frequency-hopped spread-spectrum direct access. These tools, however, are only useful to develop a limited number of signals or waveforms for specific implementations and applications.

SUMMARY

The invention generally features methods and systems for generating large families of signals with desired properties (e.g., optimal auto- and cross-correlation properties) for a variety of applications (e.g., simultaneously use multiple transmit waveforms with minimum cross-talk and optimal bandwidth allocation). One advantage of the invention is that it provides greater flexibility in the design of new sequences or waveforms by replacing the manipulation of one-dimensional signals with the combined geometric and algebraic analyses of two-dimensional images.

The invention, in one aspect, features a sequence generator for generating large families of sequences with desirable properties. The sequence generator includes a constraint application unit that applies constraints to a sequence in the Zak space to produce a constrained sequence. The constraints may be associated with predetermined properties. In some embodiments, the predetermined properties are predetermined correlation properties. The predetermined correlation properties may be perfect autocorrelation and cross-correlation properties or they may be suboptimal autocorrelation and cross-correlation properties.

In some embodiments, the sequence generator further includes a processing unit that determines at least one other different sequence based on the constrained sequence. The processing unit may include a modulation unit configured to modulate the constrained sequence. The processing unit may also include a permutation unit configured to determine permutations of the constrained sequence.

The invention, in another aspect, features another sequence generator. The sequence generator includes a sequence input unit that provides a plurality of sequences in the Zak space and a selection unit that selects sequences from the plurality of sequences based on predetermined criteria. In some embodiments, the selection unit selects subgroups of the plurality of sequences having pair-wise inter-subgroup cross-correlation that is less than a predetermined level.

The invention, in another aspect, features another sequence generator. The sequence generator includes a sequence input unit that receives parameters defining a sequence, a transform unit that transforms the sequence into a transformed sequence using the Zak transform, and a processing unit that determines at least one other different sequence based on the transformed sequence. In some embodiments, the processing unit includes a modulation unit that modulates the transformed sequence. The processing unit may also include a permutation unit that determines permutations of the transformed sequence.

The invention, in another aspect, features a method of generating a sequence in a computer. The method includes selecting through the computer an L×L complex-valued array in the Zak space. The complex-valued array includes a time index k and a frequency index j. The method also includes setting through the computer the magnitude of the complex-valued array equal to (1) L if $\bar{a}k+j \equiv 0$, modulo L, where $1 \le \bar{a} < L$, and (2) zero, otherwise. In some embodiments, the method also includes modulating through the computer the complex-valued array. In other embodiments, the method includes selecting through the computer all sequences that contain permutations of the last L−2 elements of the complex-valued array with the remaining element fixed. The method also includes mapping through the computer j to $\overline{a}j$, modulo L, for each sequence, where $1 \le \overline{a} < L$.

The invention, in another aspect, features a communications apparatus. The communications apparatus includes a first modulator that modulates digital data with code sequences that are generated by applying constraints to a sequence in the Zak space and determining permutations of the constrained sequence. The constraints may be associated with predetermined auto-correlation and cross-correlation properties. The communications apparatus also includes a second modulator configured to modulate a carrier frequency with the modulated digital data.

The invention, in another aspect, features a radar system. The radar system includes an oscillator, a plurality of encoders, and a plurality of antenna elements. The oscillator generates a radio frequency signal. Each of the plurality of encoders includes an input and an output. The inputs of each of the encoders are electrically coupled to the oscillator. The encoders encode the radio frequency signal with different codes that have been generated by applying constraints to a sequence in the Zak space, modulating the constrained sequence, and determining permutations of the modulated sequences. The constraints may be associated with predetermined cross-correlation properties. Each of the plurality of antenna elements are electrically coupled to the output of a respective encoder and transmit respective encoded radio frequency signal.

The invention, in another aspect, features another method of generating sequences in a computer. The method includes transforming an input sequence into a transformed sequence using the finite Zak transform and determining at least one other different sequence based on the transformed sequence. In some embodiments, determining at least one other different sequence includes collecting a plurality of sequences that are finitely supported on an algebraic line in the Zak space. In other embodiments, determining at least one other different sequence includes modulating the transformed sequence. In yet other embodiments, determining at least one other different sequence includes determining permutations of the transformed sequence. The method may also include transforming the at least one other different sequence into a time-domain sequence using an inverse finite Zak transform.

DESCRIPTION OF DRAWINGS

FIG. 2A is a circuit block diagram of an exemplary CDMA system.

FIG. 2B is a circuit block diagram of an exemplary DS-CDMA system.

DETAILED DESCRIPTION

Figure 1A:
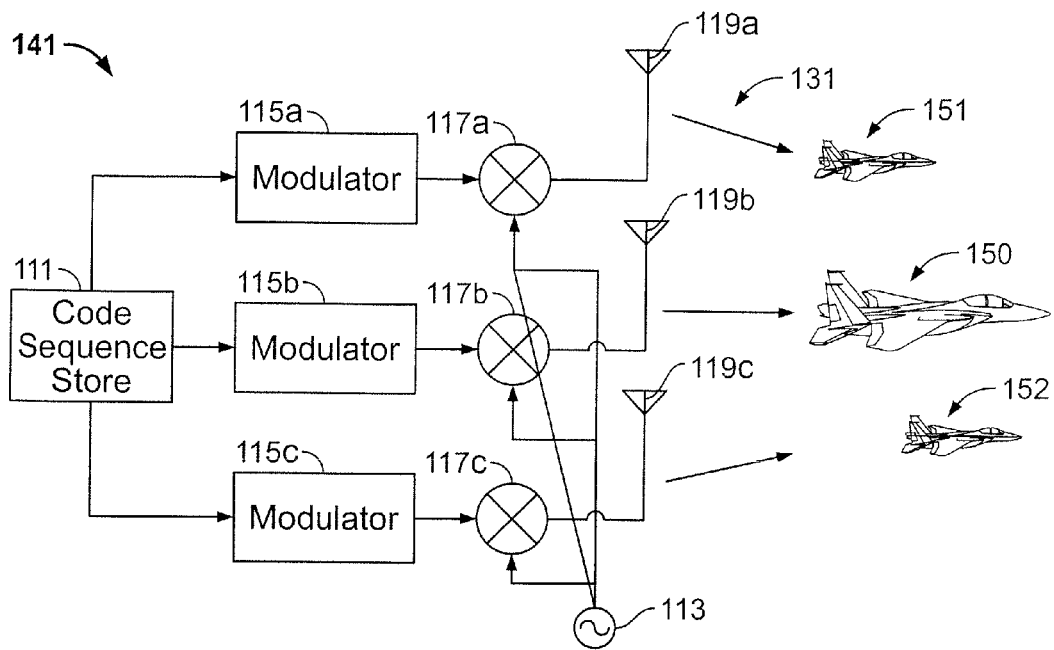
FIG. 1A is a circuit block diagram of a transmitter subsystem of an exemplary multiple-input multiple-output (MIMO) radar detection system.

Embodiments of the invention provide a unified framework for sequence design. The framework permits construction of both known and new sequence families. These new families can be selected to satisfy constraints of a specific application (e.g., good correlation properties). According to one embodiment of the invention, the finite Zak transform is used to generate a large family of sequences with perfect auto- and cross-correlation properties. In some embodiments, the sequences are poly-phase sequences, which are complex-valued sequences whose elements have an absolute value equal to one.

Signals can be modeled discretely. One way to discretely model a signal is to represent a signal $\sigma$ as an ordered collection of complex numbers $s_i$ of modulus 1:

$$\sigma = <s_1, \ldots, s_N>, |s_i|=1 \text{ for all } i$$

One refer to a particular element of a sequence $\sigma$, using the notation $\sigma(n) \equiv s_n$.

A common mathematical operation on signals is called cyclic cross-correlation, denoted $\odot$. The cyclic cross-correlation of two signals x and y is defined by:

$$z(n) = (y \odot x)_n := \frac{1}{N} \sum_{m=0}^{N-1} y(m) x^*(m-n), 0 \le n < N \qquad (1)$$

where $x^*(n)$ denotes the complex conjugate of x(n) and where m−n is taken modulo N. The cyclic cross-correlation of a signal x with itself (i.e., when y=x in the equation above) is referred to as the cyclic auto-correlation of the sequence.

As used herein, $\delta$ denotes a sequence whose first element is equal to 1, and all other elements equal 0. A sequence x satisfies the "perfect auto-correlation property" if and only if $x \odot x = \delta$. In other words, a sequence x satisfies the perfect auto-correlation property if and only if:

$$(x \odot x)_n = \begin{cases} 1, & n = 0, \\ 0, & \text{otherwise.} \end{cases}$$

Furthermore, distinct sequences x and y of length N satisfy the "perfect cross-correlation property" if and only if $|(y \odot x)_n| = N^{-1/2}$. This value is known as the Sarwate bound. If S is a set of sequences such that: (1) each sequence in S satisfies the perfect auto-correlation property, and (2) each pair of sequences in S satisfies the perfect cross-correlation property, then S meets the Sarwate bound and is said to be a "perfect sequence set." A sequence in a perfect sequence set (PSS) is called a "perfect sequence."

It is assumed herein that all signals have N elements (or are "of length N"). Moreover, as used herein, "sequence" and "signal" are synonymous.

A Zak transform is a mathematical operation on sequences and is a generalization of the discrete Fourier transform ("DFT"). If one chooses $N=KL^2$, where L and KL are positive integers, and $e_L(j)$ is set to $$e^{\frac{2\pi i j}{L}},$$

then the finite Zak transform (FZT) is given by:

$$X_L(j,k) = \sum_{r \bmod L} x(k+rKL)e_L(rj),$$

where $0 \le j < L$ and $0 \le k < KL$. The Zak transform depends on the choice of N, K, and L. However, "the" Zak transform refers to an implied fixed choice of N, K, and L. As a notational convention, a sequence is denoted in lower-case letters (e.g., x), and the Zak transform of that sequence is denoted in corresponding upper-case letters (e.g., $X_L$).

The finite Zak transform is related to the discrete Fourier transform. If $\hat{x}$ is any N-periodic sequence in $\mathbb{C}^N$ and $e_L(j)$ is set to $$e^{\frac{2\pi i j}{L}},$$

the first complex L-th root of unity, then the discrete Fourier transform $\hat{x}$ of a signal x is given by:

$$\hat{x}(m) := \sum_{n \bmod N} x(n)e_N(nm) \; 0 \le m < N.$$

The Zak transform for a fixed time index k is equal to the discrete Fourier transform of the sub-sampled signal $x_{sub}(i)=x(k+iKL)$ as i runs from 0 to L−1. In other words, computing $X_L(j,k)$ requires KL L-point DFTs of the data sets:

$$x(k), x(k+KL), \ldots, x(k+(L-1)KL), 0 \le k < KL.$$

Thus, for L=N and $K=L^{-1}$, the FZT is identical to the DFT, and for L=1 and K=N, the FZT is identical with the time sequence. The key difference between the two transforms is that, while the DFT encodes only the frequency information about a signal, the FZT encodes both the time and the frequency information about a signal.

Like the Fourier transform, the Zak transform is invertible (i.e., the FZT is a one-to-one mapping). A signal x can be recovered from its FZT $X_L$ by the formula:

$$x(k+rKL) = \frac{1}{L}\sum_{j \bmod L} X_L(j,k)e_L(-rj), \; 0 \le r < L, \; 0 \le k < KL. \quad (2)$$

The FZT is periodic in the frequency variable and quasi-periodic in the time variable:

$$X_L(j+L,k)=X_L(j,k),$$

and $$X_L(j,k+KL)=X_L(j,k)e_L(-j).$$

Additionally, the FZT behaves well under time and frequency shifts. Given a sequence x and a time-shifted sequence y that is given by $y(n)=x(n-c)$ for a constant c, where $0 \le c < KL$, then the FZT of y is given by $Y_L(j,k)=X_L(j,k-c)$. Similarly, given a sequence x and a frequency-shifted sequence z that is given by $z(n)=x(n)e_N(dn)$ for a constant d, where $0 \le d < L$, then the FZT of z is given by:

$$Z_L(j,k)=X_L(j+d,k)e_N(dk).$$

Given a sequence x, the "support" of x is defined as the set of n for which x(n) is nonzero. Similarly, given the Zak transform of a sequence $X_L$, the support of $X_L$ is the set of pairs (j,k) such that $X_L(j,k) \ne 0$. Both the Zak transform of $x(X_L)$ and the Zak transform of the DFT of $x(X_{KL})$ have supports of the same size (i.e., they are supported on sets of points of the same cardinality). This can be seen from the formula:

$$X_{KL}(j,k)=KLe_N(-jk)X_L(k,-j) \quad (3)$$

In other words, since computation of the DFT involves a ninety-degree rotation of $X_L$ and multiplication by the factor $e_N(-jk)$, it follows that $X_L$ and $X_{KL}$ are supported on sets of points of the same cardinality.

Finally, it is useful to state the behavior of the Zak transform under cross-correlation. If $z = x \odot y$, then:

$$Z_L(j,k) = \frac{1}{N}\sum_{l \bmod KL} Y_L(j,l)X_L^*(j,l-k).$$

One interpretation of this formula is an assembly of L-many KL-point time domain cross-correlations performed on frequency slices of the L×KL Zak space signals $X_L$ and $Y_L$. This formula is useful when applied to Zak space signals with small support.

One type of signal is known as a "chirp." There are a variety of chirps that are used in practice. For example, the linear frequency modulation (FM) chirp is often used in radar. The linear FM chirp signal, also known as the continuous chirp, is defined as the signal x given by:

$$x(t)=e^{\pi i \alpha t^2}e^{2\pi i \beta t}, \alpha \ne 0, 0 \le t < T, \quad (4)$$

where T is the chirp time duration, B is the chirp bandwidth, $$\alpha = \frac{B}{T}$$

is the chirp rate, and $\beta$ is the carrier frequency, and $\alpha$, $\beta$, T and $B \in \mathbb{R}$. Choosing a factorization $N=KL^2$, L, $KL \in \mathbb{Z}^+$ and sampling x(t) at times $$t = \frac{nT}{N},$$

$0 \le n < N$, produces the discrete chirp given by:

$$x(n) = e_{L^2}\left(\frac{an^2}{2}\right)e_L(bn), \; a \ne 0, \quad (5)$$

where $$a = \alpha\left(\frac{T}{KL}\right)^2$$

is the discrete chirp rate and $$b = \beta \frac{T}{KL}$$

is the discrete carrier frequency, a, b∈ $\mathbb{R}$.

To apply the Zak space (ZS) techniques and to facilitate ZS processing, two conditions can be imposed on x(n). First, x(n) is periodic with period N, i.e., x(n+N)=x(n). Second, the minimal support constraint is imposed on the Zak transform of x. The FZT of x has minimal support if it is non-zero at exactly KL points. These two constraints lead to a restriction of values of the discrete chirp parameters a and b.

A particular type of chirp is called a "finite" chirp. A finite chirp is one for which both $\bar{a}$ and $\tilde{a}$ are nonzero integers, and either: (1)

$$\frac{\tilde{a}L}{2} \in \mathbb{Z} \backslash \{0\}$$

and $\bar{b}L \in \mathbb{Z}$ or (2)

$$\frac{\tilde{a}L+1}{2} \in \mathbb{Z} \backslash \{0\}$$

and $$\bar{b}L + \frac{1}{2} \in \mathbb{Z},$$

where $\bar{a}=aK$, $\tilde{a}=aK^2$ and $\bar{b}=bK$ (which are normalizations of the chirp rate and the carrier frequency). It can be shown by routine calculation that a chirp is finite if and only if it is N-periodic and has a minimal support on the Zak transform lattice (that is, the set of (j,k) that constitute a primary domain of $X_L$).

Finite chirps have known Zak transforms. In particular, define:

$$x_k := e_N \frac{\tilde{a}k^2}{2} + \bar{b}Lk. \tag{6}$$

Then, the Zak transform $X_L(j,k)$ of a finite chirp is equal to $Lx_k$ if the condition $$\bar{a}k + j + \frac{\tilde{a}L}{2} + \bar{b}L \equiv 0(\text{mod}L)$$

is satisfied. If the condition is not satisfied, then the Zak transform of a chirp is equal to zero. Thus, this algebraic condition describes the support of the Zak transform of a finite chirp as consisting of points on an algebraic line (mod L), expressed in terms of a, b and L. In particular, the support of the Zak transform of a finite chirp is of size KL (i.e., the FZT is non-zero at exactly KL points).

Figure 3A:
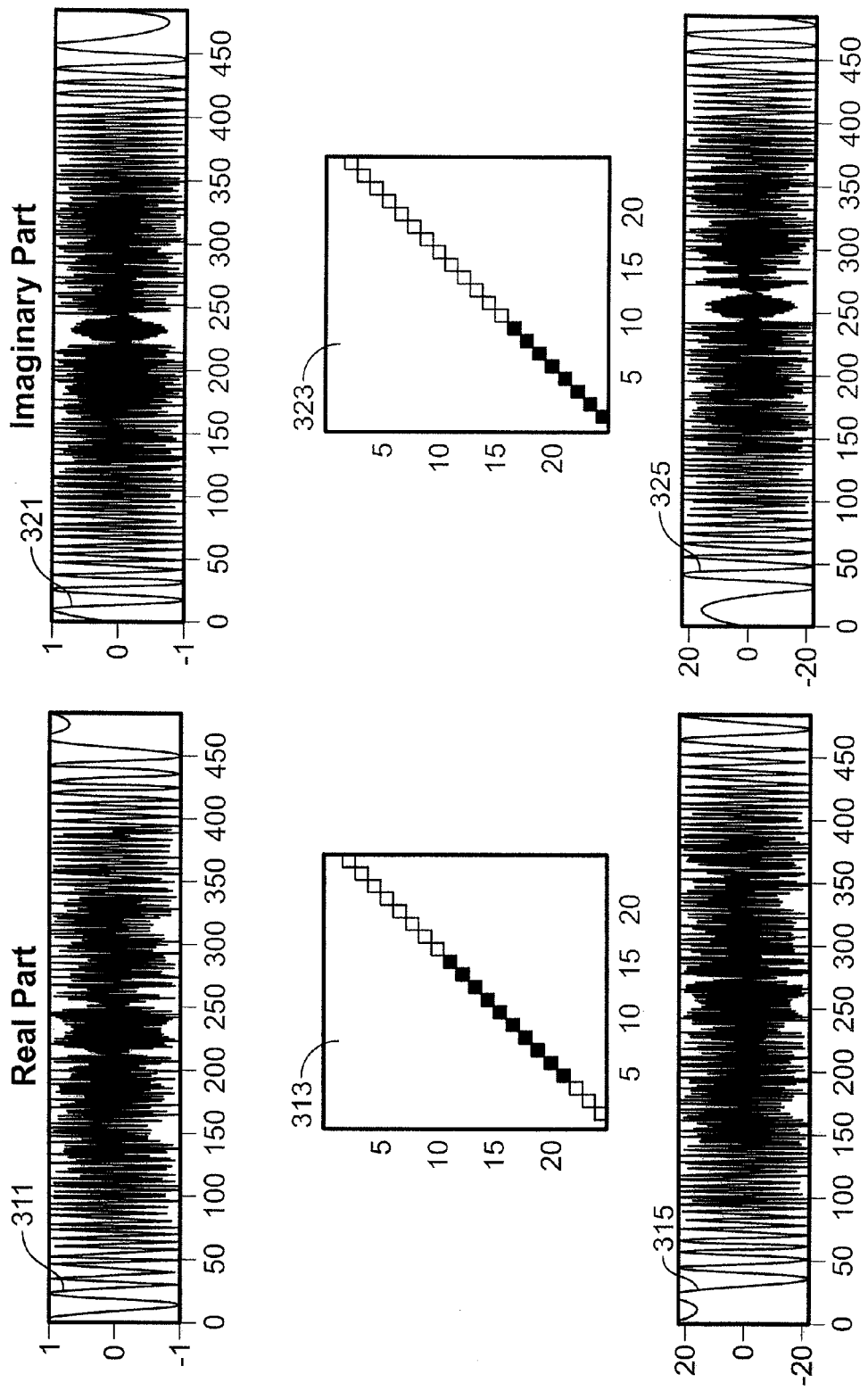
FIG. 3A includes diagrams of the real and imaginary part of a chirp sequence in the time domain, Zak-transform space, and Discrete Fourier Transform space.

FIG. 3A illustrates an example of the real part 311 and the imaginary part 321 of a finite chirp in the time domain for a=K=1, L=22 and b=½. FIG. 3A also illustrates the respective FZTs 313, 323 and DFTs 315, 325 of the real part 311 and the imaginary part 321. Since $\bar{a}=\tilde{a}=1$ and $$\frac{\tilde{a}}{2} + \bar{b} = 1,$$

the Zak space condition is satisfied.

One can show that a finite chirp satisfies the perfect auto-correlation property if and only if $(\bar{a}, KL)=1$, where $(\cdot,\cdot)$ denotes the greatest common divisor. A finite chirp satisfying the perfect auto-correlation property is called a "bat chirp."

One can identify a collection of bat chirps that additionally satisfy the perfect cross-correlation property. A set of bat chirps can be defined as follows:

$$B_L = \{X_L(j,k) | K=1, L \text{ an odd prime}, 1 \leq \bar{a} < 2L^2, L\bar{a}, 2\bar{b} \in \mathbb{Z}\}. \tag{7}$$

Here K=1, but a more general construction can be determined. In other embodiments, the conditions imposed on K and L can be relaxed or other conditions can be used. For any two chirps y and x, with chirp rates $\bar{a}_1$ and $\bar{a}_2$, $\bar{a}_1 \neq \bar{a}_2 (\text{mod } L)$, and carrier frequencies $\bar{b}_1$ and $\bar{b}_2$, where the Zak transforms of y and x, $Y_L(j,k)$ and $X_L(j,k)$, respectively, are in $B_L$, the Zak transform of the cross-correlation of y and x (i.e., the Zak transform of z in equation (1)) is given by the formula:

$$Z_L(j,k) = \begin{cases} z_k, & \left[\frac{\bar{a}_1 \bar{a}_2}{\bar{a}_2 - \bar{a}_1}\right]_L k + j \equiv 0(\text{mod}L) \\ 0, & \text{otherwise} \end{cases} \tag{8}$$

where $$z_k = e_N\left(\frac{\bar{a}_3 k^2}{2}\right) e_L(\bar{b}_3 k), \bar{a}_3 = \bar{a}_1 \left[\frac{\bar{a}_2}{\bar{a}_2 - \bar{a}_1}\right]_L^2 - \bar{a}_2 \left[\frac{\bar{a}_1}{\bar{a}_2 - \bar{a}_1}\right]_L^2,$$

and $\bar{b}_3 = \bar{b}_2 + (\bar{b}_1 - \bar{b}_2)\left[\frac{\bar{a}_2}{\bar{a}_2 - \bar{a}_1}\right]_L$ where $[\cdot]_L$ denotes modulo L.

It follows that the cross-correlation of bat chirps is a finite chirp. Indeed, the cross-correlation of bat chirps is also a bat chirp. Thus, the set B defined above is closed under cross-correlation. Moreover, by applying the inverse Zak transform (equation (2)) to equation (8), it follows that any two sequences in B satisfy the perfect cross-correlation property.

The same cannot be said of the closure of B with respect to the discrete Fourier transform. For example, when $\bar{a}$ is even, then the DFT of a sequence in B is not in B. However, the Zak transform of the DFT of a bat chirp is finitely supported on an algebraic line (this follows from equation (3)).

Figure 3B:
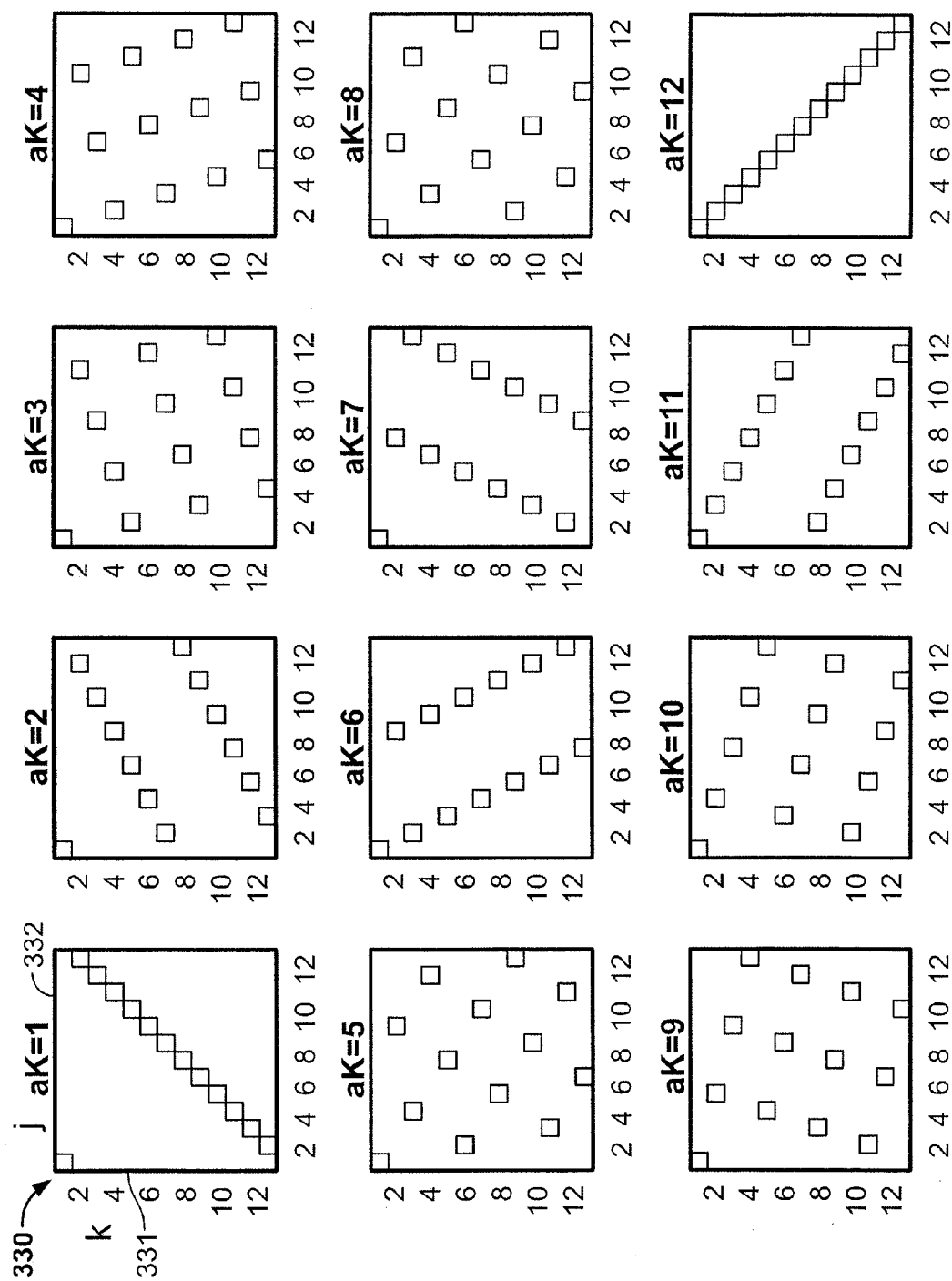
FIG. 3B includes diagrams illustrating the nonzero values of the perfect sequences of a chirp in the Zak-transform space.

An appropriate subset of bat chirps satisfying the condition of equation (7) is referred to as a Perfect Chirp Set (PCS). One such set is $B'_L = \{X_L(j,k) | K=1, L \text{ an odd prime}, 1 \leq \bar{a} < L, \bar{b}=1$ when $\bar{a}$ is even, and $\bar{b}=\frac{1}{2}$ otherwise$\}$. The size of a PCS for a fixed pair $(b_1, b_2)$ is L−1, or smaller, if $(\bar{a},L)=1$ but L is not a prime. FIG. 3B illustrates an example of a PCS. Specifically, FIG. 3B shows the FZT magnitude (represented as white squares or pixels) for L=13, $\bar{b}=1$ when $\bar{a}$ is even, and $$\bar{b} = \frac{1}{2}.$$

The vertical axis (e.g., 331) of each of the graphs (e.g., 330) represents the time index k and the horizontal axis (e.g., 332) of each of the graphs (e.g., 330) represents the frequency index j.

The family of PCS is essentially identical with the family of Zadoff-Chu sequences when the length of the sequence is a square of an odd prime. However, the Zak space construction, unlike the Zadoff-Chu construction, is not limited to bat chirps. Combining the observations in the paragraphs above allows one to identify perfect sequence sets. Namely, if $X_L(j,k)$ is an arbitrary complex-valued L×L array, such that:

$$|X_L(j,k)| = \begin{cases} L, & \bar{a}k + j \equiv 0 (\bmod L), \\ 0, & \text{otherwise}, \end{cases} \quad (9)$$

then the set of inverse FZTs of elements of the set:

$$S = \{X_L(j,k) | L \text{ an odd prime}, 1 \leq \bar{a} < L\} \quad (10)$$

is a perfect sequence set.

The support of a perfect sequence set need not lie on the algebraic line $\bar{a}k+j\equiv 0 (\bmod L)$. In fact, any unimodular sequence that contains an L-periodic subsequence and has a support on the Zak transform lattice at indexes specified by an appropriately chosen permutation sequence is a perfect sequence. This observation can be used in constructing more general perfect sequence sets than those described above.

For example, if:

$$X_L(j,k) = \begin{cases} L, & \bar{a}k + j \equiv 0 (\bmod L), \\ 0, & \text{otherwise}, \end{cases} \quad (11)$$

then the set:

$$FZT^{-1}\{X_L(j,k) | L \text{ an odd prime}, 1 \leq \bar{a} < L\} \quad (12)$$

is a PSS. The time-domain sequence:

$$x(k+rKL) = \sum_{\bar{a}k+j\equiv 0(\bmod L)} e_L(-jr) = e_L(\bar{a}rk) \quad (13)$$

is a permuted DFT sequence.

As another example, the set in (12) whose elements have FZT given by:

$$X_L(j,k) = \begin{cases} Le_L(\alpha k), & \bar{a}k + j \equiv 0 (\bmod L), \\ 0, & \text{otherwise}, \end{cases} \quad (14)$$

is a PSS. The time domain sequence is $x(k+rKL)=e_L(\alpha k)e_L(\bar{a}rk)$.

Figure 1B:
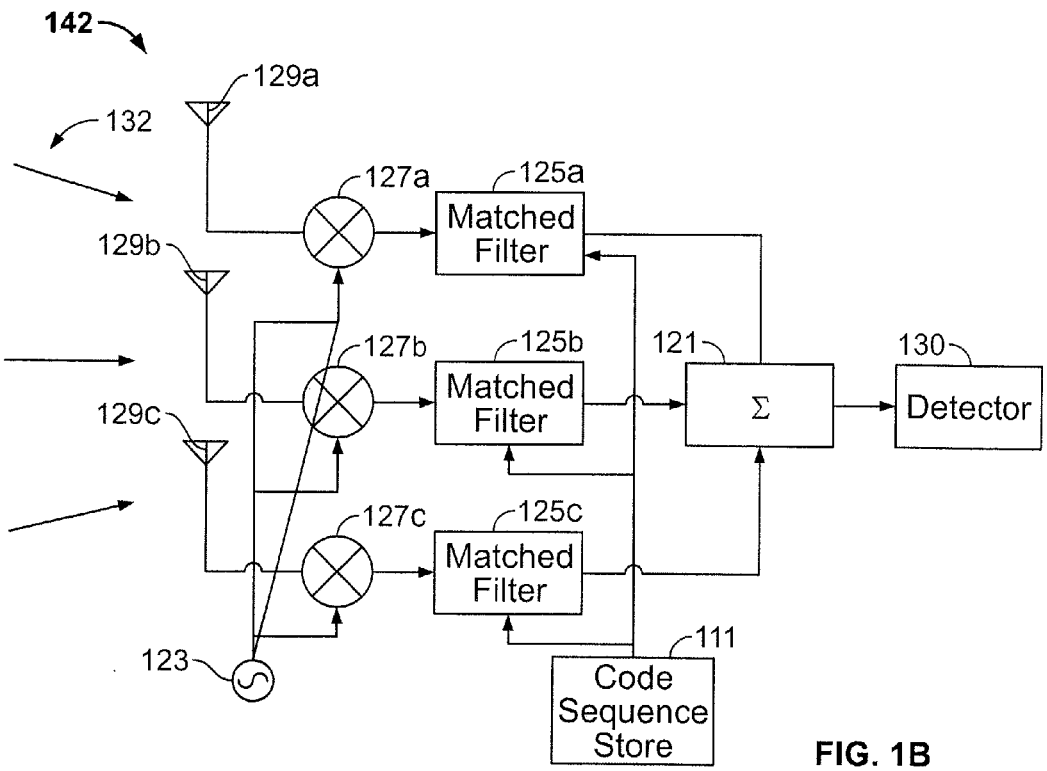
FIG. 1B is a circuit block diagram of a receiver subsystem of an exemplary MIMO radar detection system used in conjunction with the transmitter subsystem of FIG. 1A.
Figure 4:
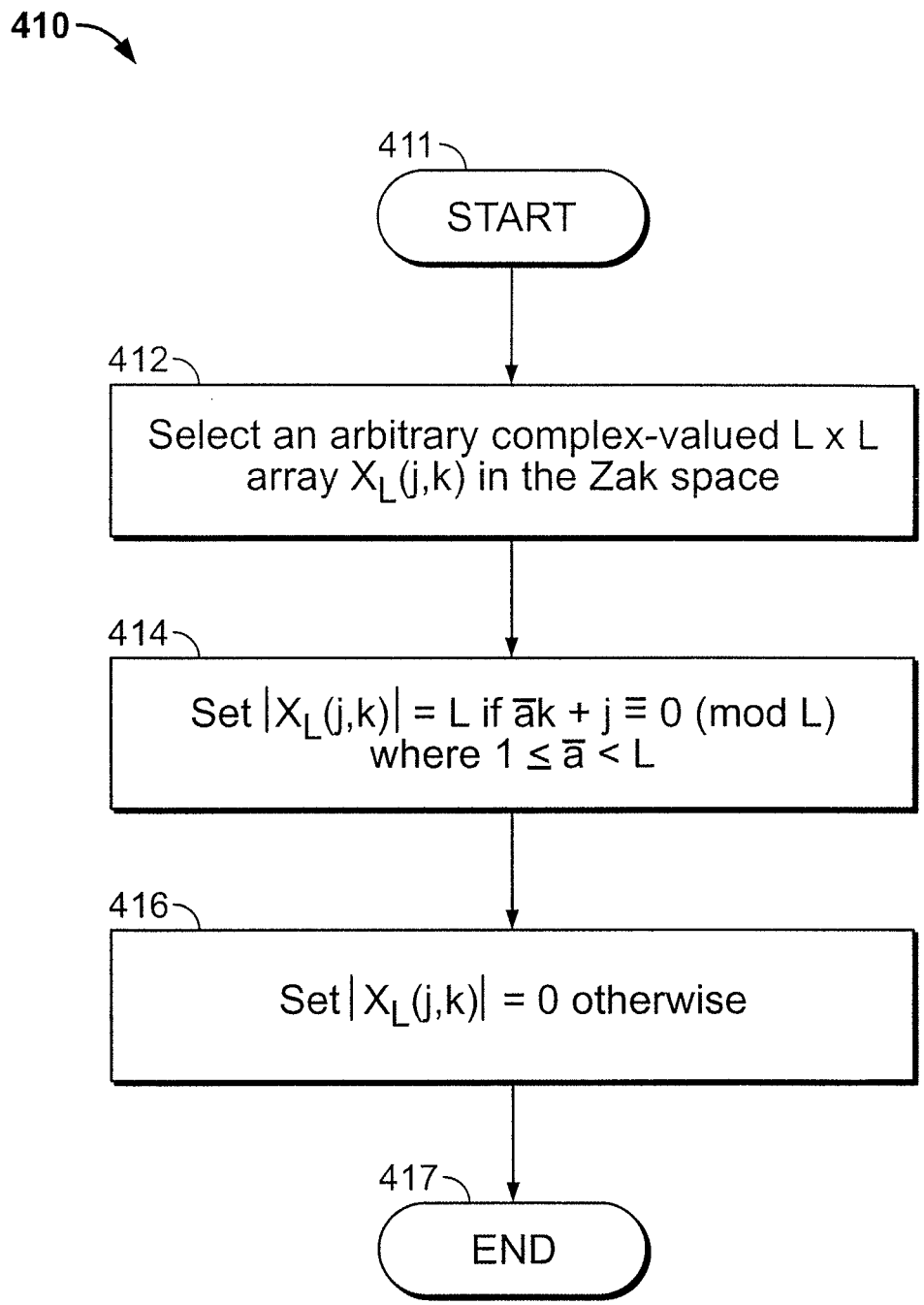
FIG. 4 is a flowchart for generating perfect sequence sets according to illustrative embodiments of the invention.

FIG. 4 is a flowchart illustrating a process 410 for generating a sequence in a computer according to equations (9) and (10). After the process 410 starts 411, an arbitrary complex-valued L×L array $X_L(j,k)$ is selected in the Zak-transform space 412. Next, the magnitude of the complex-valued L×L array $X_L(j,k)$ is set equal to L, if $\bar{a}k+j\equiv 0$, modulo L, where $1 \leq \bar{a} < L$ (414). Otherwise, the magnitude of the complex-valued L×L array $X_L(j,k)$ is set equal to zero 416. Then the process 410 ends 417. The resulting sequences can be used in applications requiring sequences with perfect autocorrelation and cross-correlation properties. For example, the resulting sequences may be stored in the code sequence store 111 of FIGS. 1A and 1B so that they are available for use by the modulators 115a-c of FIG. 1A and matched filters 125a-c of FIG. 1B. In some embodiments, a search technique can be used to select a complex-valued L×L array $X_L(j,k)$.

The set of all perfect autocorrelation sequences associated with the set B'$_L$ can be factored into (L−2)! PSS. In contrast to the construction of an individual PSS, which relies on time-frequency analysis of complex sequences, the construction of a family of PSS can be accomplished with group-theoretical analysis of permutation sequences.

For example, the PSS for L=3 is:
1. (1,2), (2,1)

where the sequences (each of which is enclosed in parenthesis) are given by the values of the frequency index j (except for j=0, for which k=0), ordered in the time index k, of the non-zero values of the associated L×L FZT. For L=5, the collection of PSSs is:
1. (1,2,3,4), (2,4,1,3), (3,1,4,2), (4,3,2,1)
2. (1,2,4,3), (2,4,3,1), (3,1,2,4), (4,3,1,2)
3. (1,3,2,4), (2,1,4,3), (3,4,1,2), (4,2,3,1)
4. (1,3,4,2), (2,1,3,4), (3,4,2,1), (4,2,1,3)
5. (1,4,2,3), (2,3,4,1), (3,2,1,4), (4,1,3,2)
6. (1,4,3,2), (2,3,1,4), (3,2,4,1), (4,1,2,3)

For L=7, there is a collection of 120 PSSs. That collection includes the following three PSSs:
1. (1,2,3,4,5,6), (2,4,6,1,3,5), (3,6,2,5,1,4), (4,1,5,2,6,3), (5,3,1,6,4,2), (6,5,4,3,2,1)
2. (1,2,3,4,6,5), (2,4,6,1,5,3), (3,6,2,5,4,1), (4,1,5,2,3,6), (5,3,1,6,2,4), (6,5,4,3,1,2)
3. (1,5,6,2,3,4), (2,3,5,4,6,1), (3,1,4,6,2,5), (4,6,3,1,5,2), (5,4,2,3,1,6), (6,2,1,5,4,3)

The collections of PSSs form partitions of the sets of all perfect auto correlation sequences. The first PSS in each partition is the set of generalized Frank sequences. The remaining PSS are formed by permutations of sequences in the first PSS. In one embodiment, the PSS can be constructed from a partition of the set of all perfect auto-correlation sequences according to the process 510 shown in FIG. 5A. After the process 510 starts 511, all sequences that contain permutations of the last L−2 elements with the remaining element being fixed are selected (512). There are (L−2)! such sequences. Then, for each of those sequences, a PSS is constructed by performing the following mapping: $j \mapsto \bar{a}j(\bmod L)$, $1 < \bar{a} < L$ (514). The process 510 then ends 519.

Figure 5A:
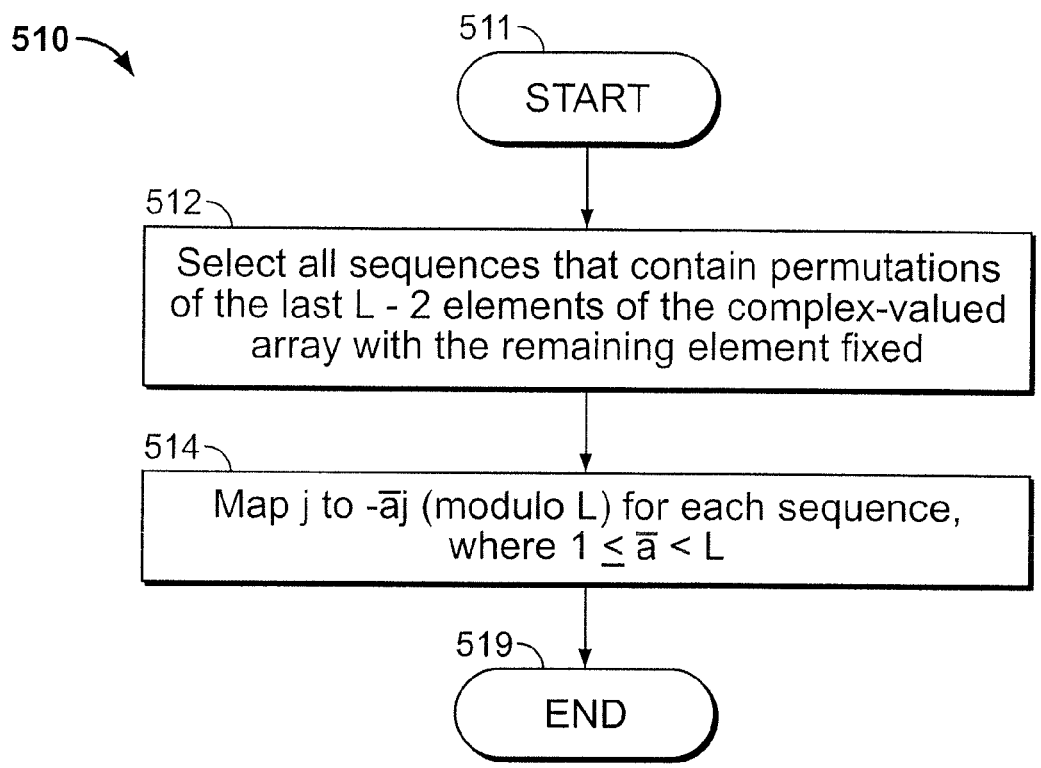
FIGS. 5A and 5B are flowcharts for generating a group of perfect sequence sets from a perfect sequence set according to illustrative embodiments of the invention.
Figure 5B:
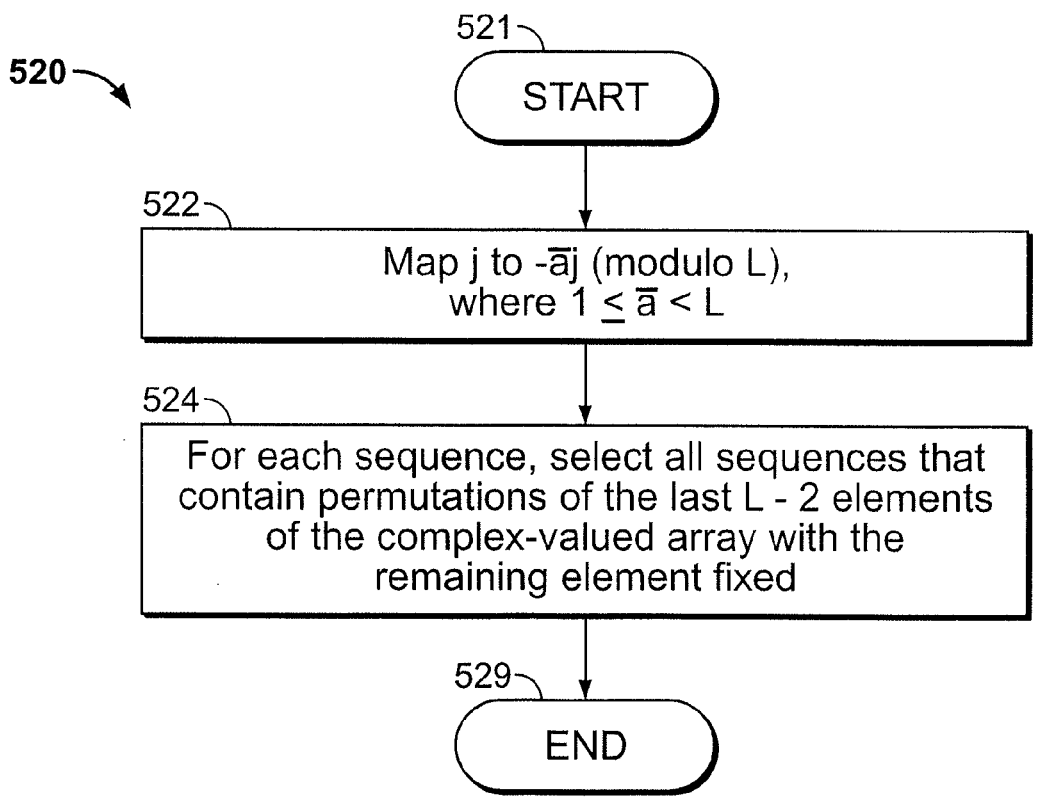

In another embodiment, a PSS can be constructed according to the process 520 shown in FIG. 5B. After the process 520 starts 521, the following mapping is performed on a given sequence: $j \mapsto \bar{a}j(\bmod L)$, $1 < \bar{a} < L$ (522) to obtain (L−2)!−1 other sequences. Then, for each of these sequences, all sequences that contain permutations of the last L−2 elements of the complex-valued array with the remaining element fixed are selected 524. The process 520 then ends 529. In some embodiments, the processes 510, 520 of FIGS. 5A and 5B can be applied to a known sequence with desirable properties for a particular application, such as a perfect chirp sequence for radar applications.

Figure 6A:
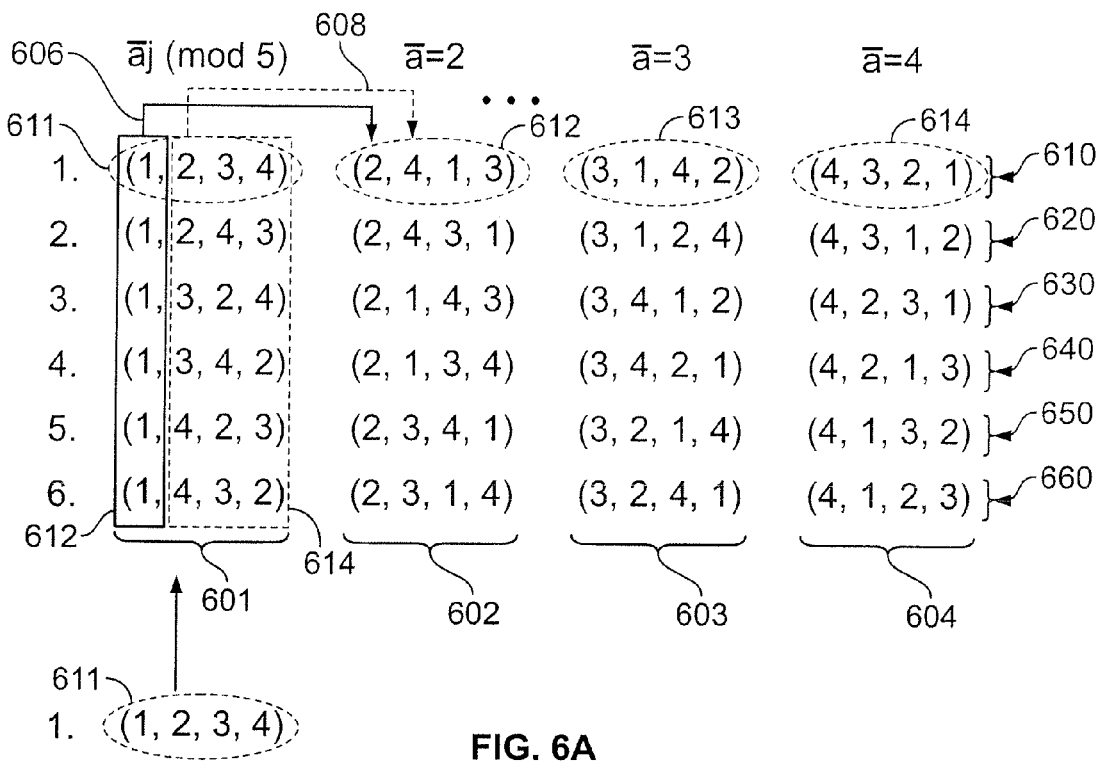
FIG. 6A is a diagram illustrating a process for generating perfect sequence sets according to illustrative embodiments of the invention.

FIG. 6A is a diagram illustrating how collections of PSSs can be generated for L=5 according to the process 510 of FIG. 5A. First, all sequences that contain permutations of the last three (L−2) elements 614 of a given sequence 611 with the remaining element j=1 fixed 612 are generated 601. As shown in FIG. 6A, there are 6((L−2)!) such sequences 601. Then, the second sequence 612 of the first PSS 610 is computed according to the mapping: $j \mapsto \bar{a}j(\bmod L)$, $1 < \bar{a} < L$. Accordingly, where $\bar{a}=2$, j=1 in the first element of the first sequence 611 maps to j=2×1(mod 5)=2 (606) in the first element of the second sequence 612, j=2 in the second element of the first sequence 611 maps to j=2×2(mod 5)=4 (608) in the second element of the second sequence 612, j=3 in the third element of the first sequence 611 maps to j=2×3(mod 5)=1 in the third element of the second sequence 612, and j=4 in the fourth element of the first sequence 611 maps to j=2×4(mod 5)=3 in the fourth element of the second sequence 612.

Where $\bar{a}$=3, j=1 in the first element of the first sequence 611 maps to j=3×1(mod 5)=3 in the first element of the third sequence 613, j=2 in the second element of the first sequence 611 maps to j=3×2(mod 5)=1 in the second element of the third sequence 613, j=3 in the third element of the first sequence 611 maps to j=3×3(mod 5)=4 in the third element of the third sequence 613, and j=4 in the fourth element of the first sequence 611 maps to j=3×4(mod 5)=2 in the fourth element of the third sequence 613. Similar mappings of the index j are performed to determine the indices in the fourth sequence 614 using $\bar{a}$=4. Similar mappings can also be performed to determine the elements of the second sequences 602, third sequences 603, and fourth sequences 604 in the other five PSSs (620, 630, 640, 650, 660).

Figure 6B:
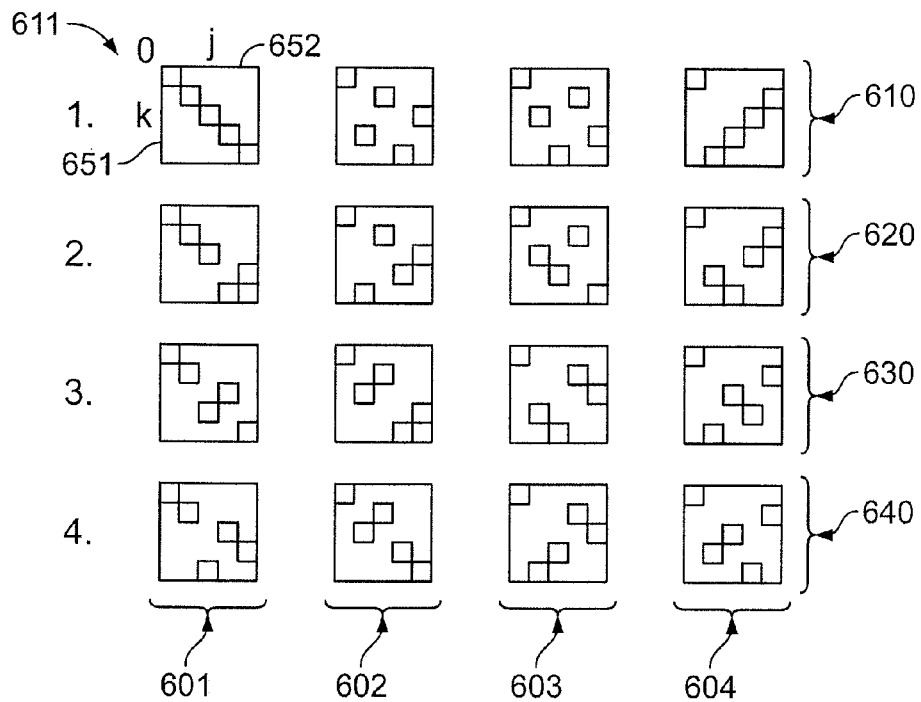
FIG. 6B is a diagram illustrating the first four perfect sequence sets generated according to the process of FIG. 6A.

FIG. 6B is a diagram illustrating the first four PSSs of FIG. 6A. As shown in FIG. 6B, the graph for the first sequence 611 of the first PSS 610 has a horizontal axis 652 that represents the frequency index j and a vertical axis 651 that represents the time index k. The sequences are given by the values of the index j (except for j=0, for which k=0), ordered in k (in other words, the first element of any given sequence represents k=1, the second element of any given sequence represents k=2, and so forth), of the non-zero values of the associated L×L FZT. For example, (2,1,4,3) is equivalent to (k=1 and j=2, k=2 and j=1, k=3 and j=4, k=4 and j=3).

Figure 7A:
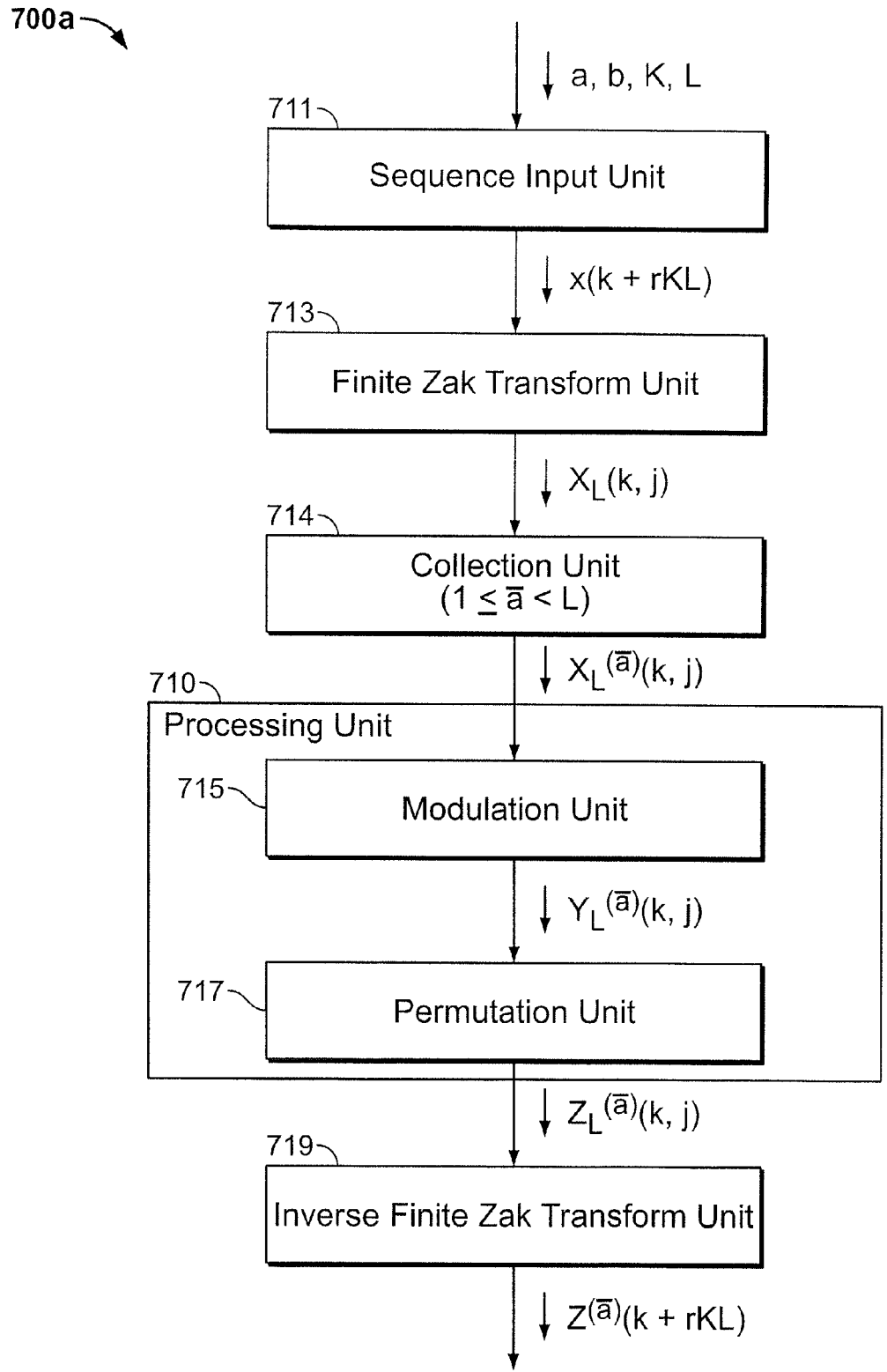
FIGS. 7A-7C are functional block diagrams of a computer-implemented system for generating sequences according to illustrative embodiments of the invention.

FIG. 7A is a functional block diagram of a computer-implemented system 700a for generating sequences, including code sequences for communications and radar applications (e.g., the communications system of FIGS. 2A and 2B). The system includes a sequence input unit 711, a finite Zak transform unit 713, an collection unit 714, a processing unit 710, which includes a modulation unit 715 and a permutation unit 717, and an inverse finite Zak transform unit 719. Other embodiments of the system may include a subset of units 711, 713-715, 717, and 719.

The sequence input unit 711 receives as inputs parameters defining a time-domain sequence x(k+rKL). In one embodiment, the parameters are a, b, K, and L, which define the discrete chirp in equation (5). The time-domain sequence x(k+rKL) is then input to the finite Zak transform unit 713. The finite Zak transform unit 713 applies the Zak transform to the time-domain sequence x(k+rKL) to produce the sequence $X_L(k,j)$. The collection unit 714 collects the sequences $X_L(k,j)$ where 1≤$\bar{a}$<L to obtain the collection of sequences $X_L^{(\bar{a})}(k,j)$ (the ($\bar{a}$) superscript indicates that $X_L(k,j)$ is indexed by $\bar{a}$). In some embodiments, the modulation unit 715 modulates the sequence $X_L^{(\bar{a})}(k,j)$ based upon predetermined properties to produce $Y_L^{(\bar{a})}(k,j)$. For example, the modulation unit 715 can modulate the sequence $X_L^{(\bar{a})}(k,j)$ with an exponential, such as in equation (14) above. In other embodiments, however, the modulation unit 715 may not modulate the sequence $X_L^{(\bar{a})}(k,j)$.

The permutation unit 717 receives the modulated sequence $Y_L^{(\bar{a})}(k,j)$ and determines permutations of that sequence (e.g., according to the processes illustrated in FIGS. 5A, 5B, 6A, and 6B). Then, the inverse Zak transform unit 719 transforms the permutations of sequences into time-domain sequences $z^{(\bar{a})}(k+rKL)$ so that they can be used, for example, in the communications and radar applications described above. In some embodiments, a digital communications signal may be modulated with a code sequence in the Zak space. Then, the inverse Zak transform unit 719 may transform the modulated digital communications signal into a time-domain signal for use in a communications system.

Figure 7B:
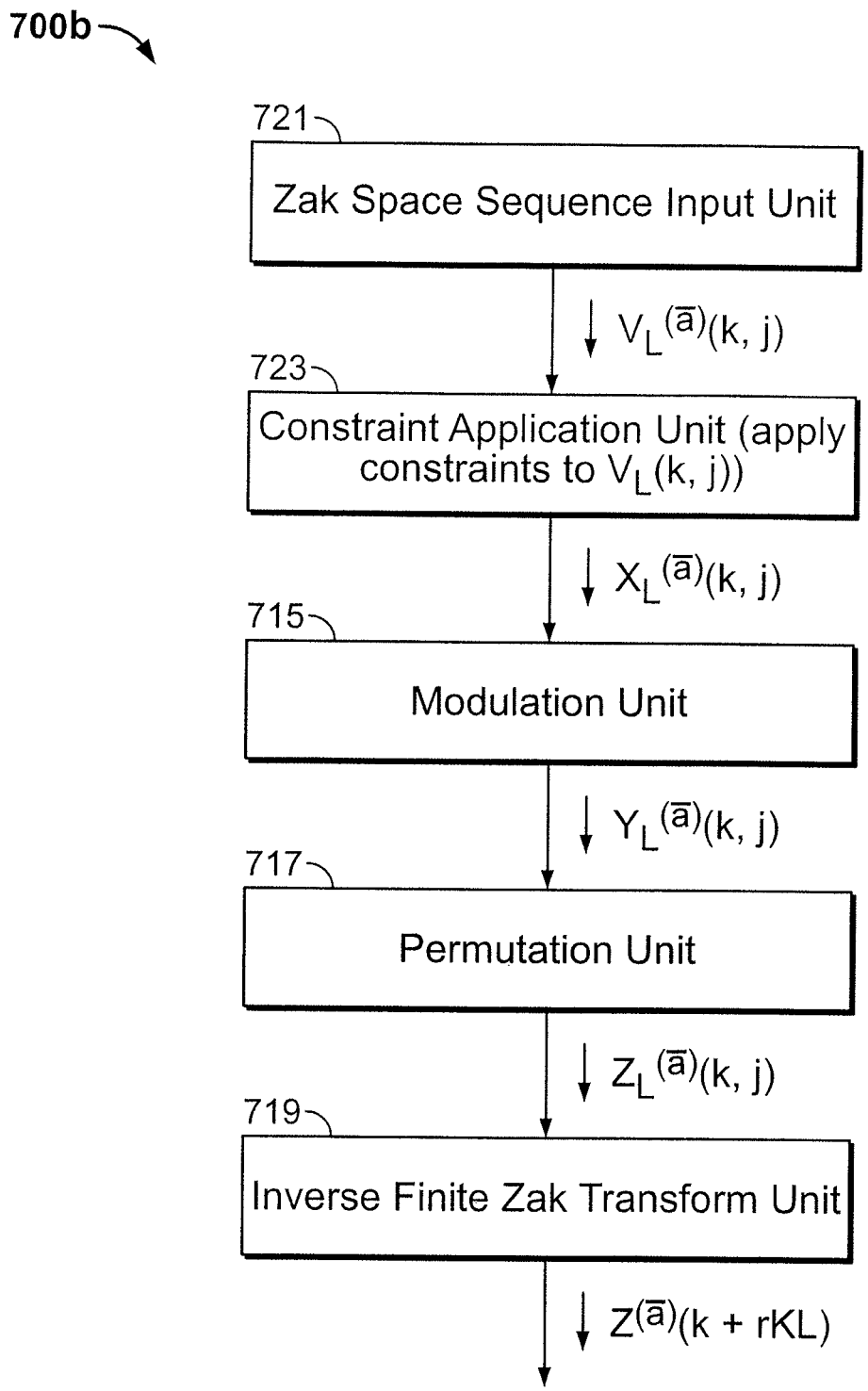

FIG. 7B is a functional block diagram of a computer-implemented system 700b for generating sequences according to another embodiment of the invention. The system 700b includes a Zak space sequence input unit 721, a constraint application unit 723, and, like the system 700a in FIG. 7A, a modulation unit 715, a permutation unit 717, and an inverse finite Zak transform unit 719. Other embodiments of the system 700b may include a subset of these units. For example, some embodiments of the system 700b may not include a modulation unit 715, while other embodiments may not include a permutation unit 717.

The Zak space sequence input unit 721 provides a sequence $V_L^{(\bar{a})}(k,j)$ in the Zak space to the constraint application unit 723. The sequence $V_L^{(\bar{a})}(k,j)$ may be selected at random or based upon a search algorithm. The constraint application unit 723 imposes the constraints on the sequence $V_L^{(\bar{a})}(k,j)$ to produce the sequence $X_L^{(\bar{a})}(k,j)$, as in the process of FIG. 4. The constraints may be associated with predetermined properties. In some embodiments, the predetermined properties are predetermined correlation properties. The predetermined correlation properties may be perfect autocorrelation and cross-correlation properties or they may be suboptimal autocorrelation and cross-correlation properties. This sequence can then be processed by the modulation unit 715, the permutation unit 717, and the inverse finite Zak transform unit 719 as in FIG. 7A. The sequences produced by the inverse finite Zak transform unit 719 may be used to obtain the spread-spectrum code sequences $C_0, C_1, \ldots, C_N$ used in the MC-CDMA system of FIG. 2A.

Figure 7C:
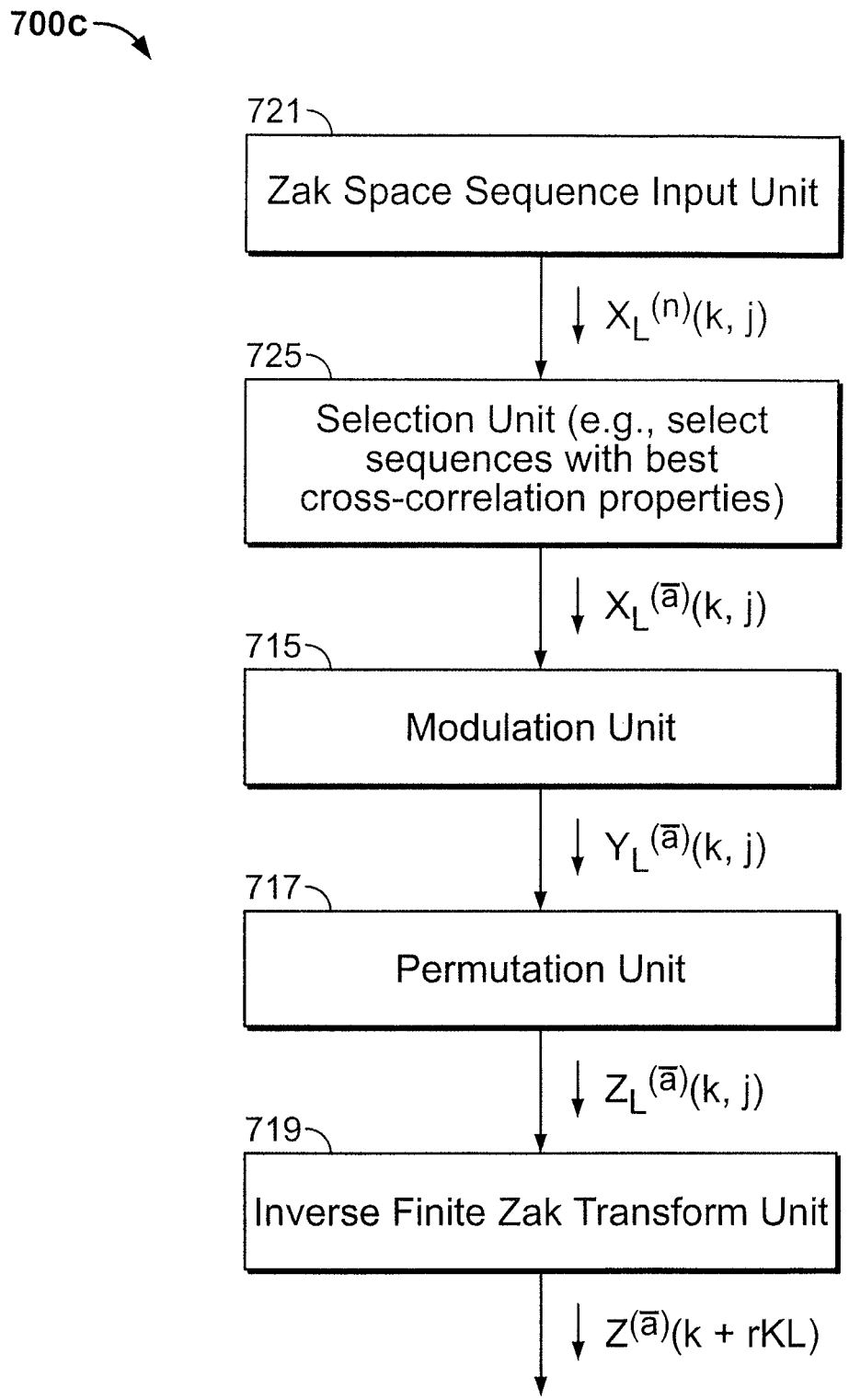

FIG. 7C is a functional block diagram of a computer-implemented system 700c for generating sequences according to another embodiment of the invention. The system 700c includes a Zak space sequence input unit 721, a selection unit 723, and, like the system 700a in FIG. 7A, a modulation unit 715, a permutation unit 717, and an inverse finite Zak transform unit 719. Other embodiments of the system 700b may include a subset of those units.

The Zak space sequence input unit 721 provides a plurality of sequences $X_L^{(n)}(k,j)$ in the Zak space, where 1≤n≤P and P>L−1, to the selection unit 725. The selection unit 725 then selects sequences $X_L^{(\bar{a})}(k,j)$ with desired properties, such as sequences with the best cross-correlation properties. These sequences can then be processed by the modulation unit 715, the permutation unit 717, and the inverse finite Zak transform unit 719 as in FIG. 7A.

The generation of sequence families can also be described in terms of group theory. A group is a set G together with an associative binary operation × such that G has an identity element (that is, an element e such that e×g=g×e=g for all g∈G), and each element g∈G has an inverse (that is, for each g there is an element $g^{-1}$ such that $g \times g^{-1} = g^{-1} \times g = e$. In general, the operation × need not be commutative; that is, g×h need not equal h×g. Hereinafter, the identity element of a group is denoted 1 (unless otherwise specified), and the operation × is not explicitly written. Instead, g×h is simply written gh, and g×g is written $g^2$.

An example of a group is given by a set of permutations. One binary operation is a right-to-left composition of permutations. That is, the permutation gh is given by performing the permutation h then performing the permutation g. It is possible for a group G to "act" on a set X. The "action" involves mapping a pair (g,x) (with g∈G and x∈X) to an element of x. For example, if G is the group of permutations on a set with five elements, and x is a set with five elements, then the action of G on x can be given by the corresponding permutations in G.

It is also possible for one group to contain another group. For example, if G is the group of permutations on a set with five elements, and h is a permutation that switches any two elements (and leaves the remaining elements fixed), then $h^2=1$ (since switching two elements, then switching them back, produced no net result). Thus, {1,h} is a group in its own right, despite existing in the larger group G. In this case, {1,h} is called a "subgroup" of G.

If the set of all perfect correlation sequences are identified with the group of (L−1)-point permutations, $G_L$, then the collection of PSSs can be associated with the right cosets of the permutation group generated by the multiplicative group of integers modulo L, $(\mathbb{Z}/L)^x$. For example, considering the group $(\mathbb{Z}/5)^x$, choosing 2 as the primitive root, and taking consecutive powers of 2 yields the permutation $\pi$: (1,2,3,4) ↦ (2,4,1,3). $\pi$ is the generator of the cyclic group:

$$H_5=\{\pi^0,\pi^1,\pi^2,\pi^3\}=\{(1,2,3,4),(2,4,1,3),(4,3,2,1),(3,1,4,2)\}$$

which is a subgroup of the group of permutations of the sequence (1,2,3,4), $G_5$, under the operation of permutation composition. It follows that the right coset decomposition of $G_5$ can be expressed, for example, as:

$$G_5=H_5\cup\{H_5(3,4)\}\cup\{H_5(2,3)\}\cup\{H_5(2,3,4)\}\cup\{H_5(2,4,3)\}\cup\{H_5(2,4)\}.$$

In general, $G_L$ has the decomposition:

$$G_L = \bigcup_{g \in G_L} H_L g$$

where $H_L$ is the cyclic permutation group associated with $(\mathbb{Z}/L)^x$. The collection of right cosets of $H_L$ in $G_L$ can be denoted by $G_L/H_L$. $G_L/H_L$ is a partition of $G_L$, i.e., any two right cosets generated by two distinct elements in $G_L$ are either identical or have an empty intersection.

An efficient construction of $G_L/H_L$ is guided by the following result. If $G_{L-1}$ is the group of permutations of the sequence (2, 3, ..., L−1), $G_{L-1} < G_L$, and since $G_{L-1} < G_L$ and $H_L < G_L$, then:

$$H_L G_{L-1} \subseteq G_L. \quad (15)$$

Moreover, since $H_L$ and $G_{L-1}$ share only the identity element, then:

$$|H_L \cap G_{L-1}|=1 \quad (16)$$

and $$|H_L G_{L-1}|=|H_L||G_{L-1}|=|G_L|. \quad (17)$$

Combining (15) and (17), one can write:

$$H_L G_{L-1} = G_L.$$

Since, by (16) $H_L G_{L-1}$ is an internal direct product, the right coset generators of $H_L$ are uniquely given by $G_{L-1}$, affording the decomposition given by:

$$G_L = \bigoplus_{g \in G_{L-1}} H_L g.$$

The construction of PSS and coset decompositions is not limited to $(\mathbb{Z}/L)^x$, but works for any permutation group associated with the permutation sequence that is a difference of two perfect sequences. In particular, for L=7, seven distinct PSS and seven associated coset decompositions can be obtained. These permutations are:

$\pi_1$: (1,2,3,4,5,6) ↦ (2,5,1,6,4,3)
$\pi_2$: (1,2,3,4,5,6) ↦ (2,6,5,3,1,4)
$\pi_3$: (1,2,3,4,5,6) ↦ (3,5,2,1,6,4)
$\pi_4$: (1,2,3,4,5,6) ↦ (3,6,2,5,1,4)
$\pi_5$: (1,2,3,4,5,6) ↦ (3,6,4,2,1,5)
$\pi_6$: (1,2,3,4,5,6) ↦ (4,6,2,5,3,1)
$\pi_7$: (1,2,3,4,5,6) ↦ (5,3,6,2,4,1).

The permutation $\pi_4$ is associated with $(\mathbb{Z}/7)^x$.

The number of distinct PSSs increases significantly for larger L. For example, for L=11, the number of distinct PSSs is equal to 684. In some embodiments, a search algorithm identifies all or a portion of the PSSs. In other embodiments, an exhaustive search may be performed to identify all PSSs.

In some embodiments, a larger sequence set could be generated at the cost of sacrificing some of the good properties of the PSS. This could be done either by constructing sub-optimal sets, relying on coset decompositions of subgroups of $G_L$ that do not satisfy the PSS property, or by selecting cosets from the standard decomposition of $G_L$ that afford minimal side-lobes in the cross-correlation of inter-coset sequences.

Sequences can be designed by exploring the upper bound on the number of PSS, (L−2)!/(L−c−1)!, where c denotes the maximum number of inter-sequence coincidences. For example, if L=5, the entire collection of sequences includes six PSS. The maximal inter-coset side-lobes are identical for all cosets.

If L=7, the entire collection of sequences includes one hundred and twenty PSS. The maximal number of coinciding sequence components between cosets varies from three to five (including the zero component). The collection of sequences that includes the first coset and has minimal pairwise inter-coset cross-correlation includes eight PSS:

1. (1,2,3,4,5,6), (3,6,2,5,1,4), (2,4,6,1,3,5), (6,5,4,3,2,1), (4,1,5,2,6,3), (5,3,1,6,4,2)
2. (1,2,4,3,6,5), (3,6,5,2,4,1), (2,4,1,6,5,3), (6,5,3,4,1,2), (4,1,2,5,3,6), (5,3,6,1,2,4)
3. (1,2,5,6,4,3), (3,6,1,4,5,2), (2,4,3,5,1,6), (6,5,2,1,3,4), (4,1,6,3,2,5), (5,3,4,2,6,1)
4. (1,2,6,5,3,4), (3,6,4,1,2,5), (2,4,5,3,6,1), (6,5,1,2,4,3), (4,1,3,6,5,2), (5,3,2,4,1,6)
5. (1,3,2,6,5,4), (3,2,6,4,1,5), (2,6,4,5,3,1), (6,4,5,1,2,3), (4,5,1,3,6,2), (5,1,3,2,4,6)
6. (1,3,6,2,4,5), (3,2,4,6,5,1), (2,6,5,4,1,3), (6,4,1,5,3,2), (4,5,3,1,2,6), (5,1,2,3,6,4)
7. (1,5,2,4,6,3), (3,1,6,5,4,2), (2,3,4,1,5,6), (6,2,5,3,1,4), (4,6,1,2,3,5), (5,4,3,6,2,1)
8. (1,5,4,2,3,6), (3,1,5,6,2,4), (2,3,1,4,6,5), (6,2,3,5,4,1), (4,6,2,1,5,3), (5,4,6,3,1,2)

As another example, if L=11, the entire collection includes 362,880 PSSs. The maximal number of coinciding sequence components between cosets varies from three to nine. The collection that includes the first coset and has minimal pairwise inter-coset cross-correlation includes, among others, the PSS given by the coset leader (1,10,9,8,4,5,2,3,6,7).

Figure 8:
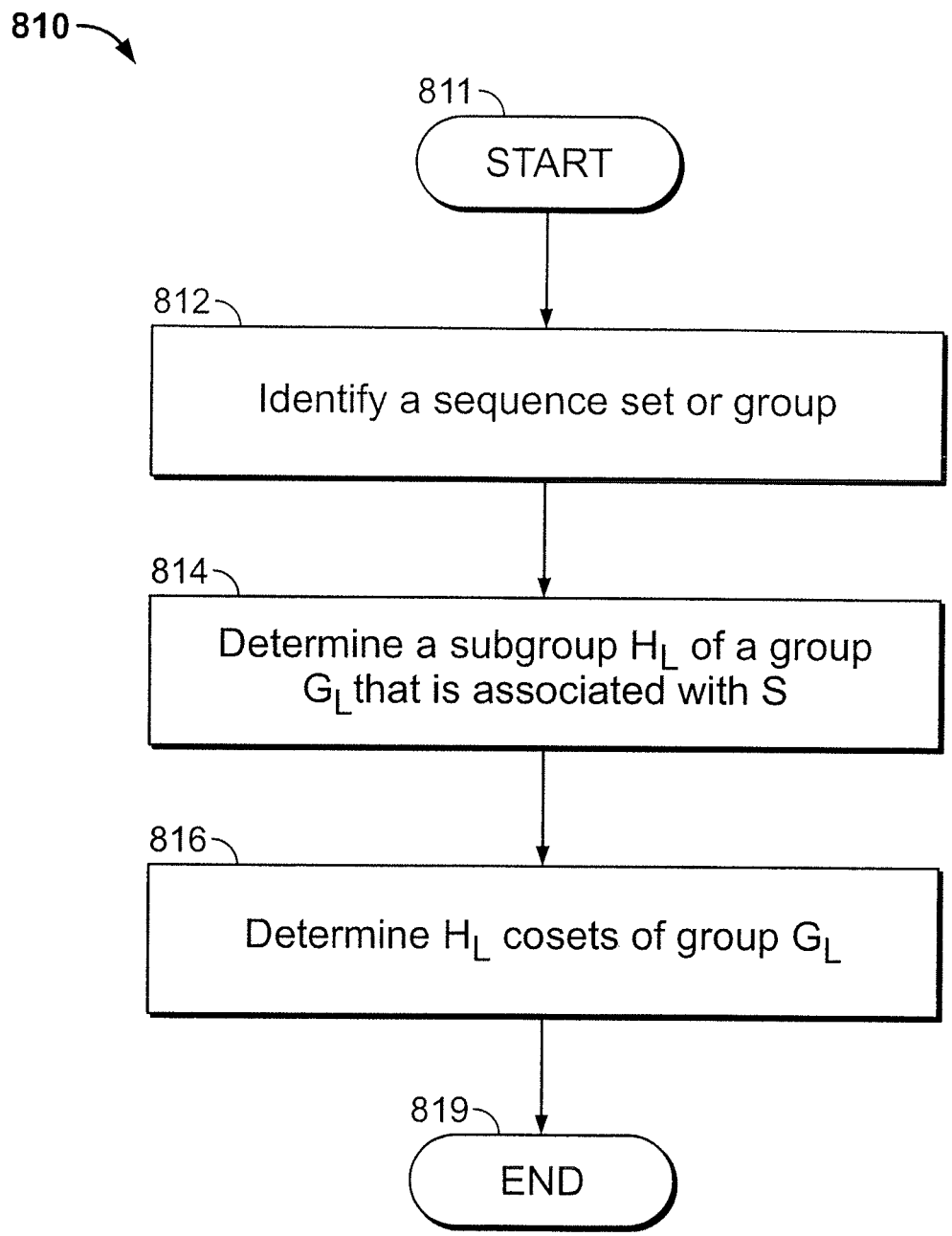
FIG. 8 is a flowchart of a process for generating perfect sequence sets according to another illustrative embodiment of the invention.

FIG. 8 is a flowchart illustrating a process 810 of identifying a perfect sequence set according to an embodiment of the invention. After process 810 starts 811, a sequence set S as described above is identified 812. Since the support of a sequence $X_L(j,k) \in S$ is lies on an algebraic line with slope $\bar{a}$, and L is an odd prime, then there are L−1 sequences in S (If L were not prime, then there would be fewer such sequences, but the techniques described herein are still applicable with suitable modification). A subgroup of $H_L$ of $G_L$ is associated with S (814), with $|H_L|=|S|=L-1$. The choice of subgroup $H_L$ is arbitrary; any bijection between $H_L$ and sequences in S is a sufficient association. For example, $H_L$ can be a cyclic subgroup generated by an (L−1)-cycle in $G_L$. Such a subgroup is equivalent to the multiplicative group of the integers modulo L.

Next, the group $G_L$ is partitioned into $H_L$-cosets 816. The process 810 then ends 819. The cosets can be denoted as $H_L g_1, H_L g_2, \ldots, H_L g_n$. The coset representatives $g_1, \ldots, g_n$ can be computed in any manner.

The use of the Zak-space approach leads to the replacement of the analysis of complex sequences with an analysis of permutation sets. This result decouples the action of permutation and modulation, thereby inserting into the analysis a degree of freedom that can be used, for example, in the design of larger, sub-optimal sequence sets (performed solely on permutation sequences), or in the design of perfect sequence sets with special properties (performed solely on modulation sequences). For example, sequences can be designed that combine good time and doppler properties. Also, sequence sets can be designed that combine good cyclic and acyclic correlation properties. Also, besides sequences whose ZS support can be described by a permutation of the algebraic line, other perfect sequence sets based on special sets of permutations can be designed.

Certain properties of perfect sequence sets make their use desirable in many applications. For example, the perfect cross-correlation property provides that different signals minimally interfere with each other, while the perfect auto-correlation property provides that a given signal minimally interferes with itself. These properties make perfect sequence sets useful for a variety of applications.

Figure 9:
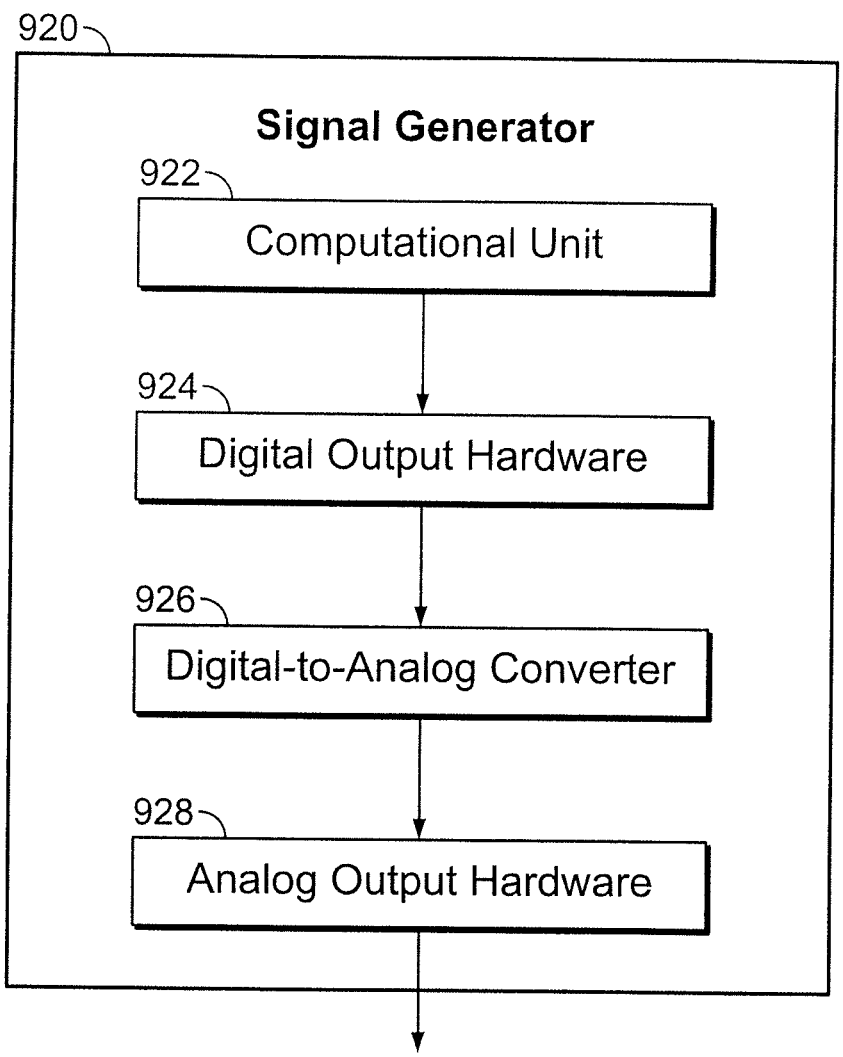
FIG. 9 is a block diagram of a signal generator system according to embodiments of the present invention.

FIG. 9 shows a signal generator 920 that can generate code sequences according to embodiments of the invention. The signal generator 920 includes a computational unit 922, digital output hardware 924, and optionally may include a digital-to-analog converter 926, and analog output hardware 928. The components 922-928 of the signal generator 920 are in mutual data communication, either directly or indirectly through other components. The data communication may be implemented in any manner, including by direct physical connection (e.g., metallic wire, fiber optic cable, etc.), wireless communication (e.g., via infrared signals, radio signals, etc.), and combinations thereof.

The computational unit 922 may be implemented as hardware, software, or a combination of hardware and software. The computational unit 922 is configured to carry out any of the computations described herein, including but not limited to the processes 410, 510, and 520 in FIGS. 4, 5A, and 5B. The computational unit 922 is further configured to pass data representative of a digital signal to the digital output hardware 924.

The digital output hardware 924 is configured to receive data representative of a (e.g., from computational unit 922), and generate the corresponding signal. The digital output hardware 924 can accomplish the signal generation in any known manner. For example, the digital output hardware may include circuitry utilizing transistors, resistors, diodes, etc. in appropriate configurations to generate electromagnetic pulses, voltage drops, or other phenomena for carrying a signal.

If present, the signal may then pass through a digital-to-analog converter ("DAC") 926. The DAC may be implemented as software, hardware, or a combination of hardware and software. The DAC 926 can employ any conversion technique, for example including: pulse width modulation, interpolation, over-sampling, binary weighting, etc. The output of the DAC 926 is an analog signal that corresponds to the signal produced by the digital output hardware 924.

If present, the analog signal may then pass to analog output hardware 928. The analog output hardware can include any hardware for transmitting analog signals, e.g. transducers such as an antenna or antenna array.

Figure 10:
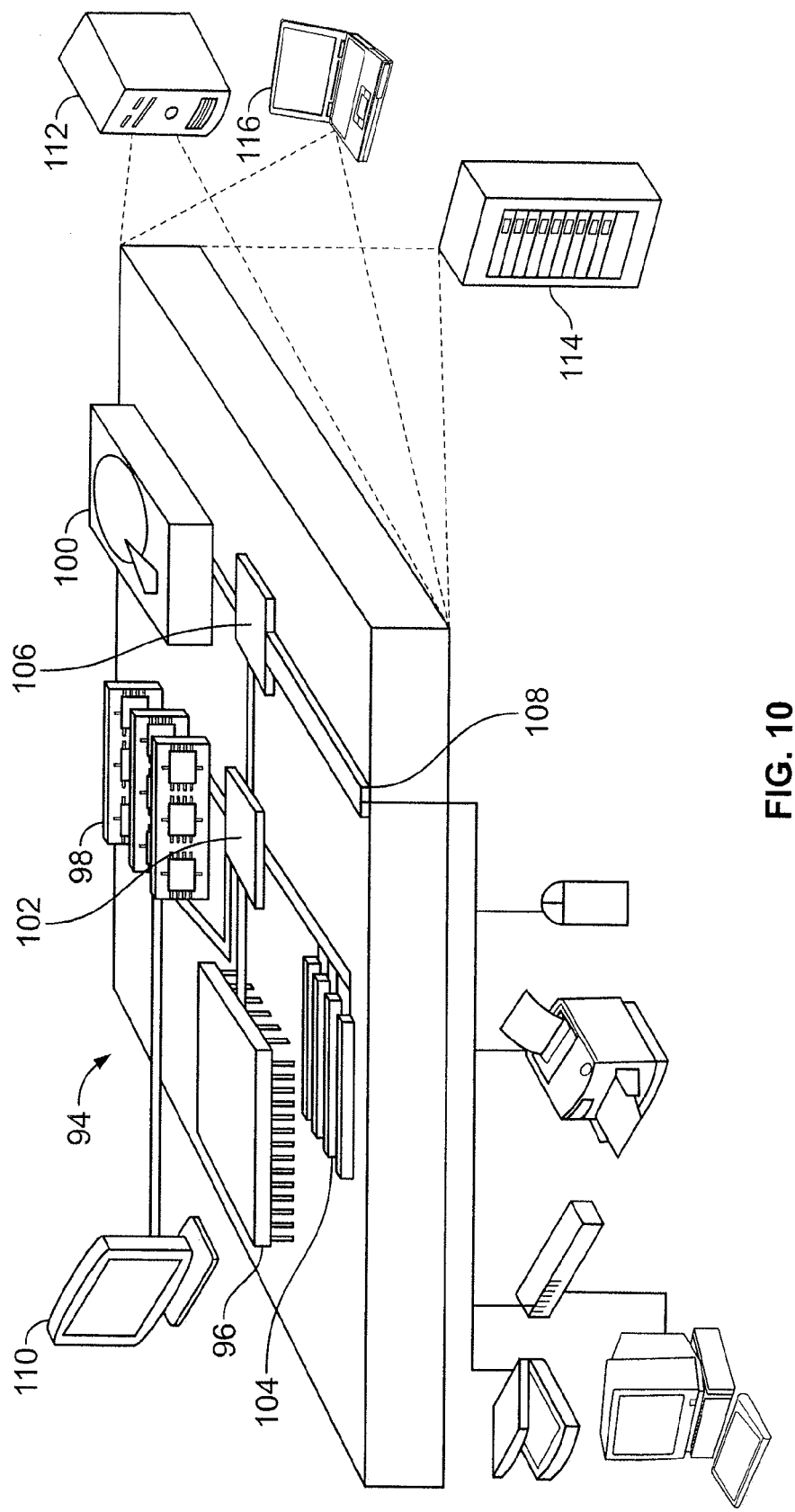
FIG. 10 is a block diagram of a computing device according to embodiments of the invention.

FIG. 10 is a block diagram of a computing system 94 that may be used to implement the various embodiments of the processes and systems described above. The system may be implemented as either a client or as a server or plurality of servers. Computing system 94 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing system 94 includes a processor 96, memory 98, a storage device 100, a high-speed interface 102 connecting to memory 98 and high-speed expansion ports 104, and a low speed interface 106 connecting to low speed bus 108 and storage device 100. Each of the components 96, 98, 100, 102, 104, 106, are interconnected using various busses, and may be mounted on a common motherboard or in other manners as appropriate. The processor 96 can process instructions for execution within the computing system 94, including but not limited to instructions stored in the memory 98 or on the storage device 100 to display graphical information for a GUI on an external input/output device, such as display 110 coupled to high-speed interface 102. In other implementations, multiple processors and/or multiple buses may be used, as appropriate, along with multiple memories and types of memory. Also, multiple computing systems 94 may be connected, with each system providing portions of the necessary operations (e.g., as a server bank, a group of blade servers, or a multi-processor system).

The memory 98 stores information within the computing system 94. In one implementation, the memory 98 is a computer-readable medium. In one implementation, the memory 98 is a volatile memory unit or units. In another implementation, the memory 98 is a non-volatile memory unit or units.

The storage device 100 is capable of providing mass storage for the computing system 94. In one implementation, the storage device 100 is a computer-readable medium. In various different implementations, the storage device 100 may be a floppy disk device, a hard disk device, an optical disk device, or a tape device, a flash memory or other similar solid state memory device, or an array of devices, including but not limited to devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 98, the storage device 100, and memory on processor 96.

The high-speed interface 102 manages bandwidth-intensive operations for the computing system 94, while the low speed interface 106 manages lower bandwidth-intensive operations. Such allocation of duties is exemplary only. In one implementation, the high-speed interface 102 is coupled to memory 98, display 110 (e.g., through a graphics processor or accelerator), and to high-speed expansion ports 104, which may accept various expansion cards (not shown). In the implementation, low speed interface 106 is coupled to storage device 100 and low speed bus 108. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing system 94 may be implemented in a number of different forms, as shown in the figure. For example, it may be implemented as a standard server, or multiple times in a group of such servers. It may also be implemented as part of a rack server system 114. In addition, it may be implemented in a personal computer such as a laptop computer 116.

Various implementations of the computing system 94 can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including but not limited to at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. The terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including but not limited to a machine-readable medium that receives machine instructions as a machine-readable signal. The term "machine-readable signal" refers to any signal used to provide machine instructions and/or data to a programmable processor.

To provide for interaction with a user, the computing system 94 can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback), and input from the user can be received in any form, including but not limited to acoustic, speech, or tactile input.

The computing system 94 can be implemented in a computing system that includes a back end component (e.g., as a data server), a middleware component (e.g., an application server), a front end component (e.g., a client computer having a graphical user interface or a Web browser through which a user can interact with an implementation of the computing system 94), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A computerized-method of generating a sequence set in a computer, comprising:
   determining through the computer L–1 sequences for the set by:
   a) selecting through the computer one L×L complex-value array for each value of $\bar{a}$, where $1 \leq \bar{a} < L$ and where each L×L complex-valued array is in the finite-Zak-transform space, each complex-valued array comprising a time index k and a frequency index j, and
   (b) setting through the computer the magnitude of each L×L complex-valued array equal to (1) L if $\bar{a}k+j \equiv 0$, modulo L, where $1 \leq \bar{a} < L$, and (2) zero, otherwise;
   generating (L–2)! through the computer additional sequence sets by permuting non-zero entries in the L–1 sequences; and
   storing the (L–2)! in a memory of the computer the additional sequence sets such that the additional sequence sets can be retrieved or transmitted during signal processing.

2. A computerized-method of generating a sequence set in a computer, comprising:
   determining through the computer L–1 sequences for the set by:
   a) selecting through the computer one L×L complex-value array for each value of $\bar{a}$, where $1 \leq \bar{a} < L$ and where each L×L complex-valued array is in the finite-Zak-transform space, each complex-valued array comprising a time index k and a frequency index j, and
   (b) setting through the computer the magnitude of each L×L complex-valued array equal to (1) L if $\bar{a}k+j \equiv 0$, modulo L, where $1 \leq \bar{a} < L$, and (2) zero, otherwise;
   generating through the computer L to the L-th power additional sequence sets by:
   multiplying through the computer non-zero entries in the finite-Zak Transform space of the sequence set by a unique set of values from a set $\{1, e\_L(1), \ldots e\_L(L-1)\}$; and
   storing in a memory of the computer the L to the L-th power additional sequence sets such that the additional sequence sets can be retrieved or transmitted during signal processing.

* * * * *